United States Patent [19]

Ichikawa et al.

[11] Patent Number: 4,813,313
[45] Date of Patent: Mar. 21, 1989

[54] APPARATUS FOR DEMOLISHING A REACTOR SHIELD WALL

[75] Inventors: Makoto Ichikawa; Kaneo Takahashi; Mitsuo Tokomoto; Hironori Zaita; Kazunori Kooyama, all of Tokyo; Kashiro Ureshino, Kobe; Katsuhiko Yoshida, Takasago, all of Japan

[73] Assignees: Kabushiki Kaisha Kobe Seiko Sho, Kobe; Shimizu Kensetsu Kabushiki Kaisha, Tokyo, both of Japan

[21] Appl. No.: 68,248

[22] PCT Filed: Nov. 25, 1986

[86] PCT No.: PCT/JP86/00600
§ 371 Date: Jun. 25, 1987
§ 102(e) Date: Jun. 25, 1987

[87] PCT Pub. No.: WO87/03325
PCT Pub. Date: Jun. 4, 1987

[30] Foreign Application Priority Data

Nov. 25, 1985 [JP] Japan .................. 60-265588
Nov. 25, 1985 [JP] Japan .................. 60-265591
Nov. 25, 1985 [JP] Japan .................. 60-265592
Nov. 25, 1985 [JP] Japan .................. 60-265593
Nov. 25, 1985 [JP] Japan .................. 60-265590
Sep. 8, 1986 [JP] Japan .................. 61-211136
Sep. 8, 1986 [JP] Japan .................. 61-211137

[51] Int. Cl.$^4$ .................. E04G 23/08; G21F 9/28
[52] U.S. Cl. .................. 82/128; 82/169; 82/82; 83/178; 83/923; 376/260; 299/70
[58] Field of Search .................. 376/260; 29/723, 400 N, 29/426.1, 426.4; 82/44, 82, 4 R; 83/178, 923; 299/70, 42, 48, 52

[56] References Cited

U.S. PATENT DOCUMENTS 3,370,888 2/1968 Skendrovic .................. 299/70
4,594,774 6/1986 Barker et al. .................. 376/260
4,664,873 5/1987 Hendrich et al. .................. 376/260

FOREIGN PATENT DOCUMENTS 3009492 10/1980 Fed. Rep. of Germany .
50-11959 2/1975 Japan .
57-161273 10/1982 Japan .
58-35500 3/1983 Japan .
58-110173 6/1983 Japan .
59-18500 1/1984 Japan .
59-27297 2/1984 Japan .
59-26100 2/1984 Japan .
60-44898 3/1985 Japan .
60-84643 6/1985 Japan .
2139804 11/1984 United Kingdom .................. 376/260

OTHER PUBLICATIONS

Supplementary European Search Report.

Primary Examiner—Deborah L. Kyle
Assistant Examiner—Daniel Wasil
Attorney, Agent, or Firm—Oblon, Fisher, Spivak, McClelland & Maier

[57] ABSTRACT

The invention relates to an apparatus for demolishing a reactor shield wall. The apparatus has a pillar (2) extending from the top side of the reactor toward the bottom of the reactor, an upper support device (3) for supporting the upper portion of the pillar (2) at the top side of the reactor, and cutting devices (5, 6) mounted to the pillar so as to be upwardly and downwardly movable along the pillar (2). The pillar (2) is rotatably supported by the support device (3). The upper support device (3) has drive devices (30, 31, 32) for rotating the pillar (2). The cutting devices (5, 6) are caused to swing in the reactor interior by rotating the pillar (2). The drive devices are disposed at the top side of the reactor, and this permits easy maintenance and inspection.

12 Claims, 28 Drawing Sheets

APPARATUS FOR DEMOLISHING A REACTOR SHIELD WALL

TECHNICAL FIELD

This invention relates to an apparatus for demolishing a reactor shield wall, or the like.

BACKGROUND ART

The inner surface layer of a shield wall of a reactor which has long been in operation is generally radioactively contaminated. In the process of demolishing such a wall in connection with the removal of such a reactor, it is a usual practice to employ a remotely operable demolishing apparatus.

A prior-art demolishing apparatus of this type is disclosed in Japanese Published Unexamined Patent Application No. 59-27297.

This prior-art apparatus has a pillar extending from above the top of the reactor toward the bottom thereof and cutting devices mounted up and down movably on the pillar for cutting the reactor shield wall. Each cutting device is retractably laterally extensible, that is, extensible toward and retractable from the shield wall, and is swingable around the pillar. In this known demolishing apparatus, the cutting device has a complex gear mechanism incorporated in it for allowing such up-and-down and swinging movement of the cutting device.

Now, demolishing work for removal of a reactor is generally carried out over a long period of time, and meanwhile, the demolishing apparatus must be subject to periodic maintenance and inspection. In view of this, therefore, it is desirable that a driving portion of the apparatus should be positioned at the top of the reactor so as to permit easy access thereto for inspection and to minimize the possibility of being exposed to radioactive contamination.

From this standpoint, the construction of the known demolishing apparatus has a drawback in that the drive mechanism, i.e., the gear mechanism for the cutting device, is incorporated in the cutting device itself. Accordingly, it is an object of the invention to provide an apparatus for demolishing a reactor shield wall wherein a mechanism for driving cutting devices may be mounted on the top of the reactor. More specifically, the object of the invention is to provide a shield wall demolishing apparatus such that a drive mechanism for swinging cutting devices may be allowed to remain located on the top of the reactor.

DISCLOSURE OF THE INVENTION

This object is accomplished in accordance with the invention in that the pillar is swingable so as to allow swinging movement of the cutting devices as described above. More particularly, the pillar is swingably supported by an upper support device which is provided with a drive device for actuating the pillar to swing.

According to this arrangement, the drive device is driven to actuate the pillar to swing, so that each cutting device is allowed to be positioned at any desired position on and about the pillar.

According to this arrangement, at least the drive device for actuating swing motion of the pillar is mounted on the top of the reactor and this permits easy maintenance and inspection and eliminates the possibility of exposure to radioactive contamination.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BEST MODES FOR CARRYING OUT THE INVENTION

Preferred embodiments of the invention will now be described in detail with reference to the accompanying drawings.

First Embodiment

Referring first to FIGS. 1 through 6, inclusive, there is shown a first embodiment.

Figure 1:
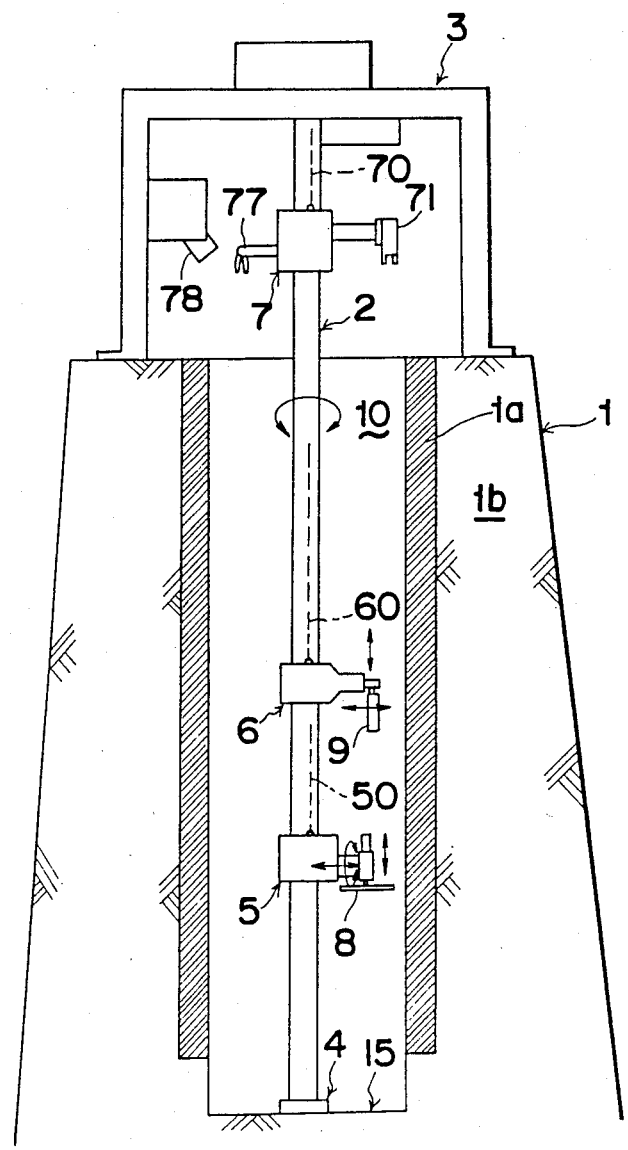
FIG. 1 is a sectional front view showing a reactor shield-wall demolishing apparatus according to a first embodiment of the invention.

In FIG. 1, the demolishing apparatus in accordance with the invention is shown as applied to a pressurized water reactor (PWR).

In the figure, reference numeral 1 designates a shield wall, of which a portion shown by reference numeral 1a repesents a surface layer contaminated by radioactivity. This portion 1a is to be demolished by means of the apparatus. A further wall portion or inner wall portion 1b continued radially outward from the surface layer 1a is free from radioactive contamination; accordingly, this wall portion is demolished by a separate demolishing apparatus after the surface layer 1a has been demolished and removed.

Referring further to FIG. 1, a pillar 2 is disposed centrally in a reactor interior 10 surrounded by the shield wall 1, the pillar 2 being rotatably supported at its upper end by an upper support device or frame 3 mounted on the top of the reactor. The pillar 2 is also rotatably supported at its lower end by a lower support device 4 disposed at the reactor bottom 15. Cutting devices 5, 6, which serve as demolishers, and a gripper device 7, which serves as a remover, are mounted to the pillar so as to be movable upwardly and downwardly, on the pillar 2 by being hung by wires 50, 60, and 70, respectively.

Figure 2:
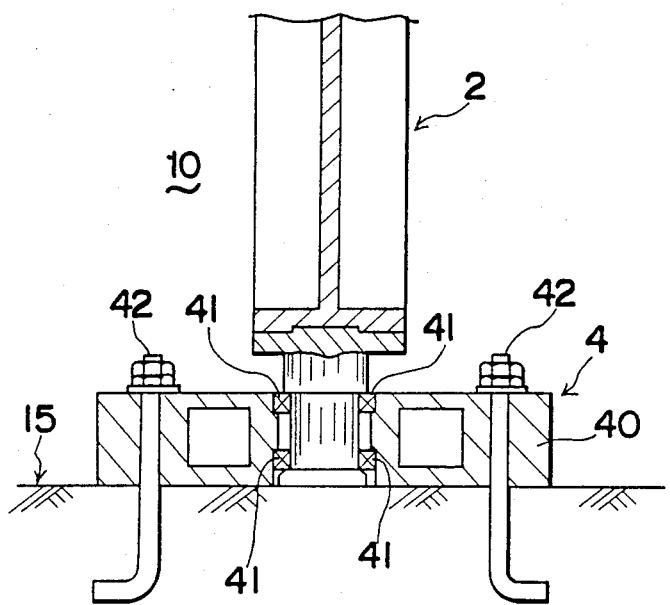
FIG. 2 is a sectional view showing a lower support device set on the bottom of the reactor for supporting a pillar.

As shown in FIG. 2, the lower support device 4, which supports the pillar 2 at its lower end, comprises a body 40, anchor bolts 42, and bearings 41. The body 40 is fixed by the anchor bolts 42 embedded into the reactor bottom 15, the pillar 2 being rotatably supported at its lower end in said body 40 through bearings 41.

Figure 3:
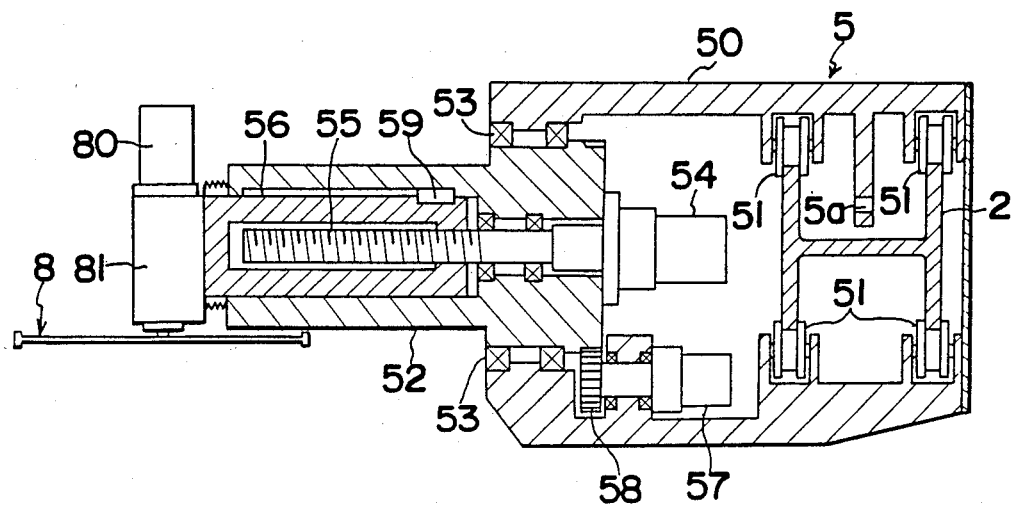
FIG. 3 is a sectional view of a cutting device.

FIG. 3 shows the construction of the cutting device 5. This cutting device 5 includes a casing 50, a cylindrical arm 52 supported by the casing 50 through bearings 53, a piston rod 56 housed in the arm 52, and a disk-shaped cutter blade 8 mounted to a front end portion of the rod 56. The casing 50 has rollers 51 disposed therein which are in rolling engagement with the pillar 2, which serves as a rail, so that the casing 50 is up and down movable along the pillar 2. The piston rod 56 is axially projectably fitted in the arm 52 on one end side thereof while being prevented by a sliding key 59 from rotation. At the other end of the arm 52 there is mounted a motor 54 which drives a screw shaft 55 into rotation, said screw shaft 55 being threadedly fitted into the piston rod 56. A rotation force transmission mechanism 81 for the cutter blade 8 which is driven by the motor 80 into rotation is mounted at the front end of the piston rod 56. On the outer periphery of the arm 52 at one end thereof, there is formed a toothed wheel with which a pinion 58 is in mesh engagement which is driven by a motor 57. The orientation of the blade 8 may be set by driving this motor 57. More specifically, for vertical cutting the blade 8 is oriented in the vertical direction, whereas for transverse cutting, the blade 8 is oriented in the horizontal direction. Shown at 5a is a hole for fastening the wire 50.

Figure 4:
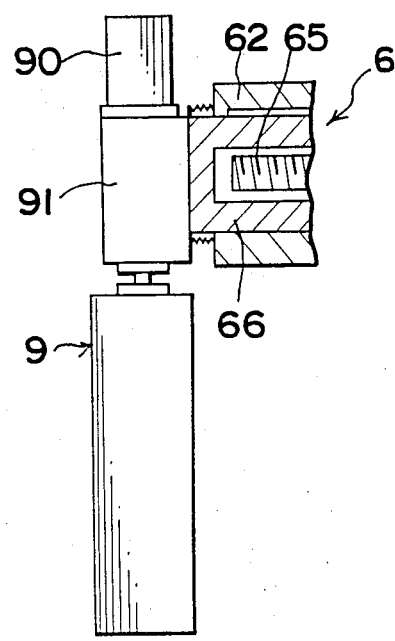
FIG. 4 is a partial sectional view of another cutting device.

The construction of the other cutting device 6 is generally same as that of the above described cutting device 5 except that its front end portion is of such configuration as illustrated in FIG. 4. In the arm 62 there is housed a piston rod 66 which is in threaded engagement with a screw shaft 65, and at the front end of the piston rod 66 there is mounted a rotation force transmission mechanism 91 which transmits the rotation force from a motor 90 to a core bit 9. It is noted that the cutting devices 5 and 6 may be integrally constructed so that the core bit 9 and the cutter blade 8 are allowed to project from a same casing in different directions. Another alternative may be that the cutter blade 8 and the core bit 9 is made mountable to the front end of a same piston rod in exchange for each other so that they can perform their respective cutting functions at different times.

Figure 5:
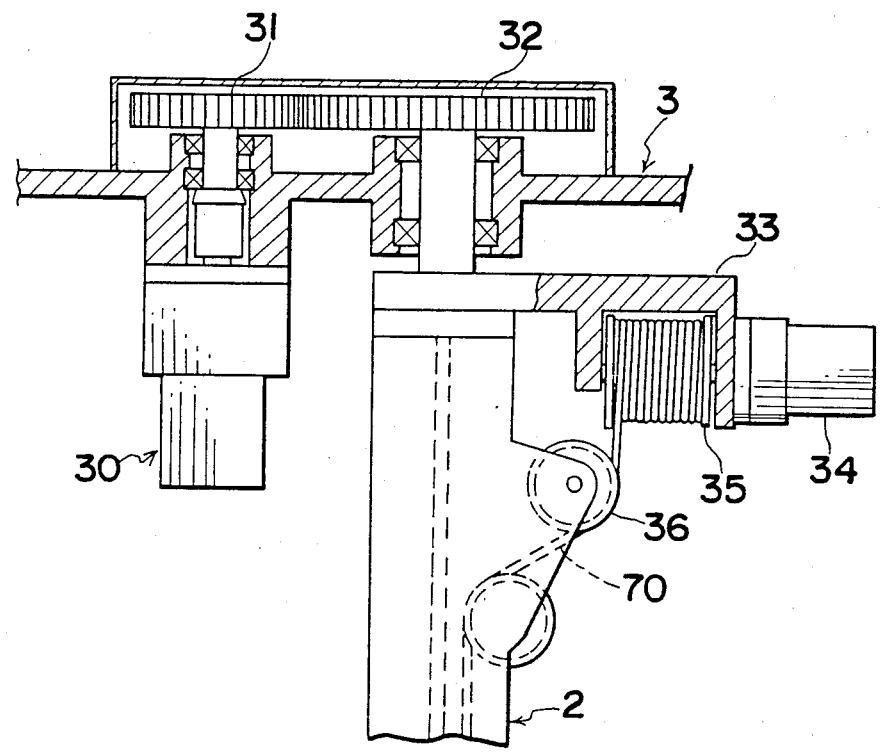
FIG. 5 is a front view in section showing an upper portion of the pillar.

FIG. 5 shows the construction of upper end portion of the support shaft 2. In the frame 3 there are mounted a pinion 31 and a gear 32 which is in mesh with the pinion 31, a lower portion of said gear 32 being coupled with the upper end of the pillar 2, whereby the pillar 2 is swingably or rotatably supported by the frame 3. The rotational movement of the pillar 2 is intended to swing the cutting devices 5, 6 and gripper device 7, all of which are mounted on the pillar 2 so as to be movable upwardly and downwardly along the pillar, thereby causing them to perform the required work of demolishing and removing the shield wall 1 which will be explained hereinafter.

A drum 35 which rotates under a drive force of a motor 34 is mounted in a recessed projection 33 at the lower end of the gear 32, and the wire 70 passing through the pillar 2 is wound on the drum 35 via a pulley 36. The wires 50, 60 each is likewise wound on a drum of a similar construction (not shown). The cutting devices 5, 6 and the gripper device 7 are moved upward and downward by winding these wires 50, 60, 70 onto and off the corresponding drums.

The individual motors are remotely operated. Each process of operation is monitored by a TV camera 78 mounted in the frame 3.

Figure 6:
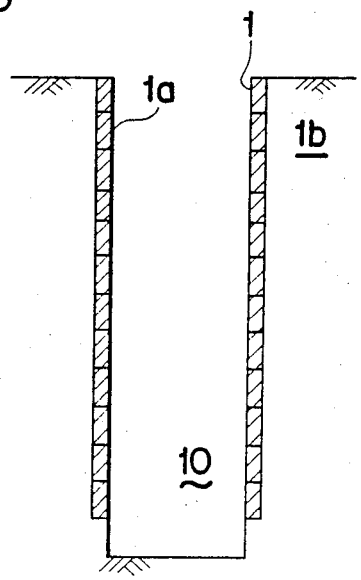
FIG. 6 is a sectional view showing a cut mode of a surface layer of a shield wall.

Next, the manner of operation of the apparatus will be explained. As FIG. 6 shows, the surface layer 1a of the shield wall 1 is cut into a multiplicity of blocks, then demolished and removed. Cutting operation is first carried out by the cutting device 6 for separation of the surface layer 1a from the inner wall portion 1b, proceeding from the upper side to the lower side. That is, the cylindrical core bit 9 is operated to cut a multiplicity of horizontally successive pits in inner wall portion 1b adjacent to the surface layer 1a, and cylindrical cut-pieces remaining in the individual pits are removed by means of a grip 77 of the gripper device 7. Slits are thus formed by the resulting series of successive holes. Then, the cutter blade 8 of the cutting device 5 is operated to cut a series of vertical and horizontal slits, and blocks 19 thus separated are individually transported upward by means of a grip 71 of the gripper device 7 for removal. In conjunction with this cutting operation, it is desirable that water is sprayed over each wall portion being cut to prevent dust from being produced by cutting, thereby preventing the scattering of dust containing toxic gases and the like.

In the above described process of operation, the positioning and orientation of the cutter blade 8 is carried out by setting the following three factors, namely, the amount of radial blade projection from the pillar 2, longitudinal orientation, and transverse orientation. Referring to FIG. 3, the casing 50 is moved to the desired level by causing the roller 51 to roll along the pillar 2 through winding up or off of the wire 50, then the screw shaft 55 is rotated by driving the motor 54 to allow the piston rod 56 to project over the desired distance, and the motor 57 is driven to rotate the arm 52 through the pinion 58 so that the cutter blade 8 is oriented in the desired direction. Then, the cutter blade 8 is rotated by driving the motor 80 to cut the surface layer 1a. Meanwhile, longitudinal slit forming is carried out by moving the casing 50 upward and downward and horizontal slit forming is carried out by rotating the pillar 2 via the pinion 31 and the gear 32 by driving the motor 30 at the upper end of the pillar 2. The positioning of the core bit 9 is carried out in same manner as above described.

As described above, the setting of the pillar 2 is carried out by supporting the pillar 2 rotatably by the upper support device or frame 3 and the lower support device 4. Cut and demolished wall pieces in block form are transported upward for removal. Therefore, no particular work is required in the reactor interior for pillar setting and removal, and thus all demolishing and removing operations can be performed efficiently.

Further, the fact that the drive mechanisms for the up and down movement of the cutting devices 5, 6 and grip device 7 and for rotation of the pillar 2 are disposed on the top of the reactor as above described provides the advantages that the work required in the reactor interior 10 for maintenance and inspection can be minimized and that the moving portions such as cutting devices can be of light weight construction, it being thus possible to reduce the size of the apparatus as a whole. Moreover, according to the above described arrangement, in the case that the cutter blade, or the like, is damaged during cutting operation, the relevant cutting device is elevated to the top of the reactor for change of the blade or the like and is subsequently returned quickly and accurately to its former position through the guiding action of the pillar. A further advantage is that since the pillar has no protrusion, or the like which may interfere with the movement of the cutter blade and the like, cutting and demolishing operations can be easily performed with respect to the entire wall portion of the reactor interior.

Second Embodiment

In the first embodiment, the lower support device 4 is of the type which is set at the bottom of the reactor. In a second embodiment shown in FIGS. 7 to 11, inclusive, however, there is employed a support device 4' mounted to the lower end of the pillar 2 and remotely controllable for engagement with and disengagement from the inner surface of the shield wall 1.

Figure 7:
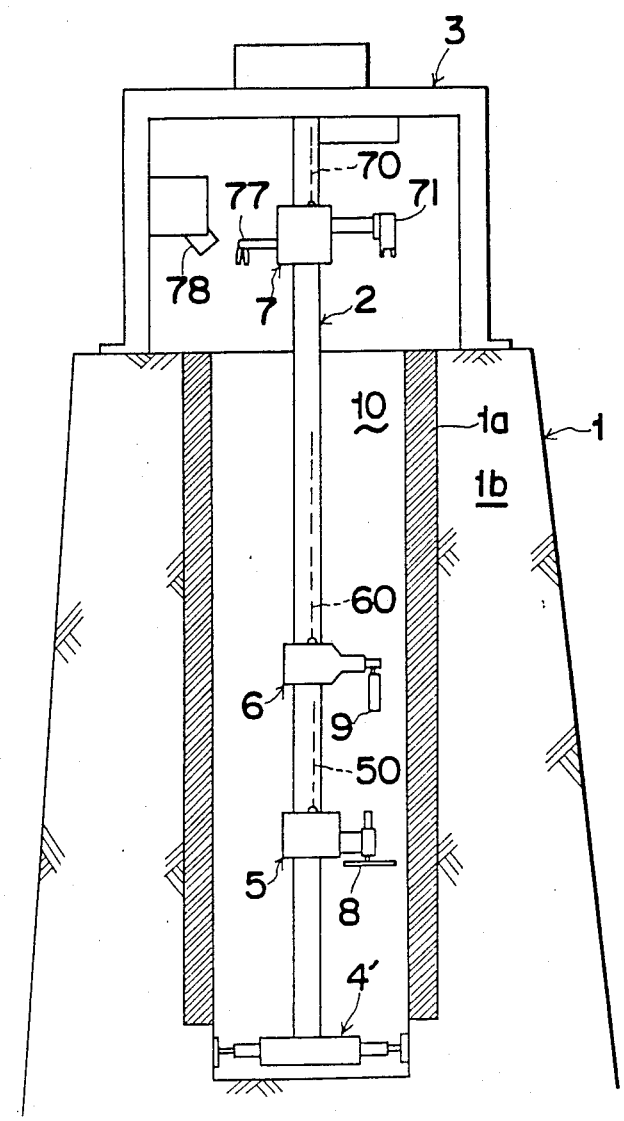
FIG. 7 is a sectional view in front elevation showing a reactor shield-wall demolishing apparatus according to a second embodiment of the invention.
Figure 8:
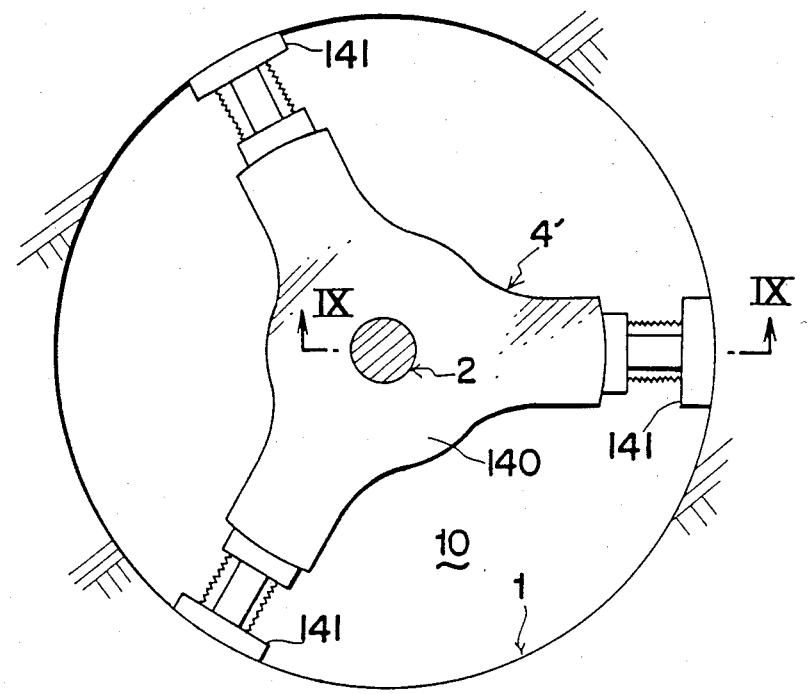
FIG. 8 is a plan view showing a lower support device in FIG. 7.
Figure 9:
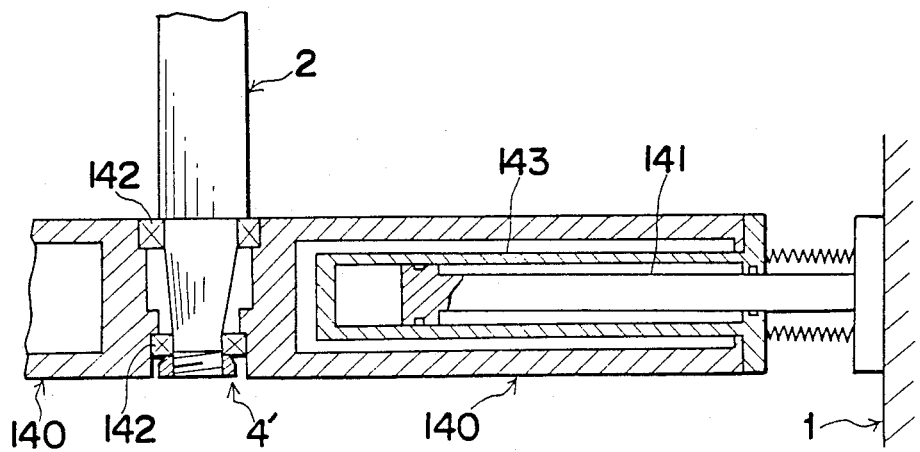
FIG. 9 is a section taken on line IX—IX in FIG. 8.

This second embodiment will now be described with reference to FIGS. 7 to 9.

The support device 4' has a body 140 and a plurality of arms 141 projecting radially in horizontal directions, each arm 141 being in contact at its front end with the inner surface of the shield wall 1. In this embodiment, the arms 141 are three in number, but they may be provided in any desired number. The body 140 is rotatably connected to the pillar 2 through bearings 142. In the body 140 there are disposed cylinders 143, each cylinder having a piston rod housed therein which constitutes one of the arm 141. Accordingly, the arms 141 are adjustably projectable from the body 141. The stretching and contraction of the arms 141 are done through a hydraulic circuit. Pipelines for the hydraulic circuit are not shown in the drawings. The hydraulic circuit is remotely controlled on the top side of the reactor.

According to the above described arrangement, three arms 141 are extended for contact at their respective front ends with the inner surface of the shield wall 1, whereby the lower end of the pillar 2 can be accurately positioned.

Figure 10:
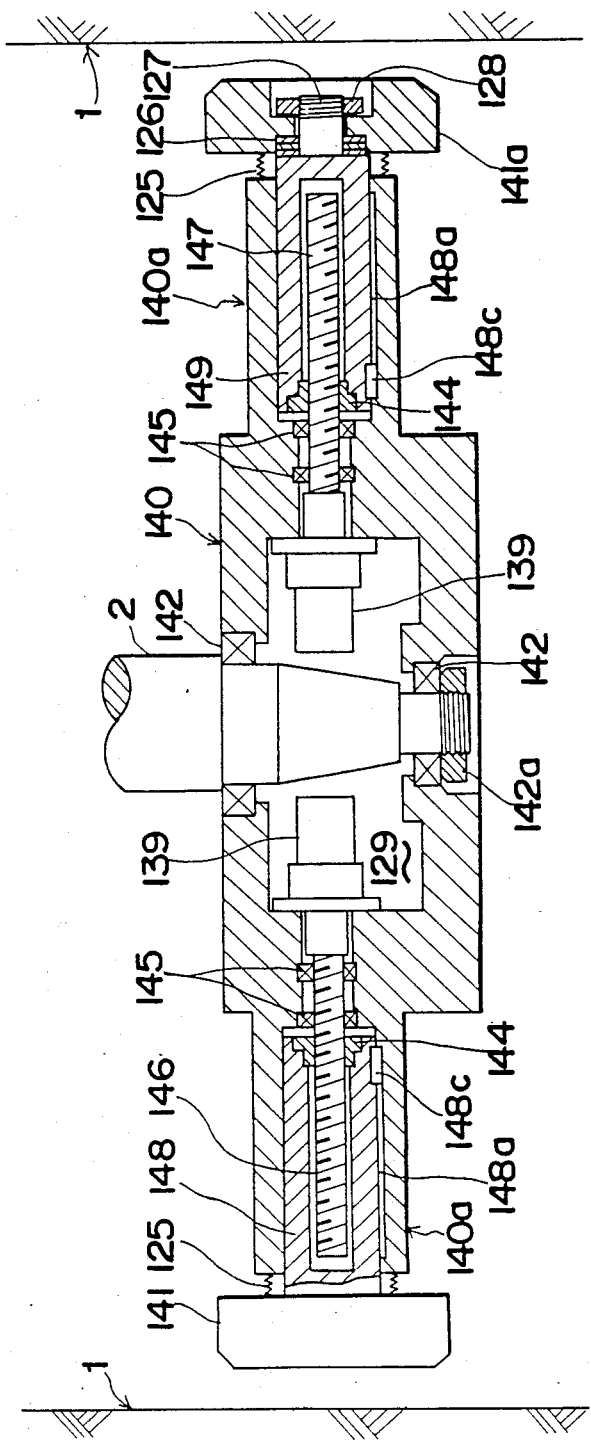
FIGS. 10, 11 and 12 are, respectively, longitudinal sections showing modifications of the lower support device.

FIG. 10 shows a modification of the second embodiment. In this modification, the body 140 has a plurality of cylindrical legs 140a (three in number as shown) projecting in horizontal directions. The body 140 is rotatably mounted to the lower end of the pillar 2 through a pair of bearings 142, upper and lower, with a bearing nut 142a fixed below the lower bearing 142. Arms 148, 149, each constituting a piston rod, are movably housed for back and forth movement in the legs 140a, each arm having a support pad 141 or 141a, as the case may be, mounted to the front end thereof for abutment with the shield wall 1. The arms 140a may be arranged in two tiers, upper and lower.

One support pad 141 has a positioning function, and the other support pads 141a, 141a have a clamping function. That is, the pillar 2 is positioned when the one support pad 141 is radially projected over a certain distance for abutment with the shield wall 1, and thereupon the other two support pads 141a, projected radially, are pressed against the shield wall 1, whereby the entire lower support device is fixed to the wall.

A space 129 is defined within the body 140, and motors 139 are disposed in the space 129. Screw shafts 146, 147 powered by the motors 139 for rotation are threadedly fitted in the arms 148, 149 respectively and are rotatably supported by bearings 145. The motors 139 may be either hydraulic or electric motors, but should be with a break in order to prevent any decrease in the supporting power of the support legs which may otherwise be possibly caused in the course of supporting service of the legs. The screw shafts 146, 147 are engaged by corresponding internal threads 144 mounted in the arms 148, 149, and whirl-stop keys 148c mounted respectively to the arms 148, 149 are fitted in corresponding grooves 148a cut axially in the legs 140a; through this arrangement, the arms 148, 149 are allowed to project toward and retreat from the shield wall 1 as the screw shafts 146, 147 are rotated. At the respective front ends of the legs 140a, and between the respective front ends and the support pads 141, 141a, there are mounted bellows 125 for covering the arms 148, 149.

A support pad 141 is mounted directly to the front end of the arm 148. At the front end of the arm 149 there is mounted a shaft 127 which extends through the support pad 141a, with a spring 126 interposed between the front end of the arm 149 and the support pad 141a, the shaft 127 being threadedly engaged by a nut 128, whereby the support pad 141a is fixedly mounted in position. The spring 126 serves to determine the reaction force from the shield wall 1 to which the support pad 141a is subject, that is, the force for supporting the pillar 2 in position, and it also serves to absorb any distortion, such as minute surface irregularity, present on the inner surface of the cylindrical shield wall 1. For this purpose, therefore, the spring 126 should be one having a suitable degree of stretchability and resiliency.

Figure 11:
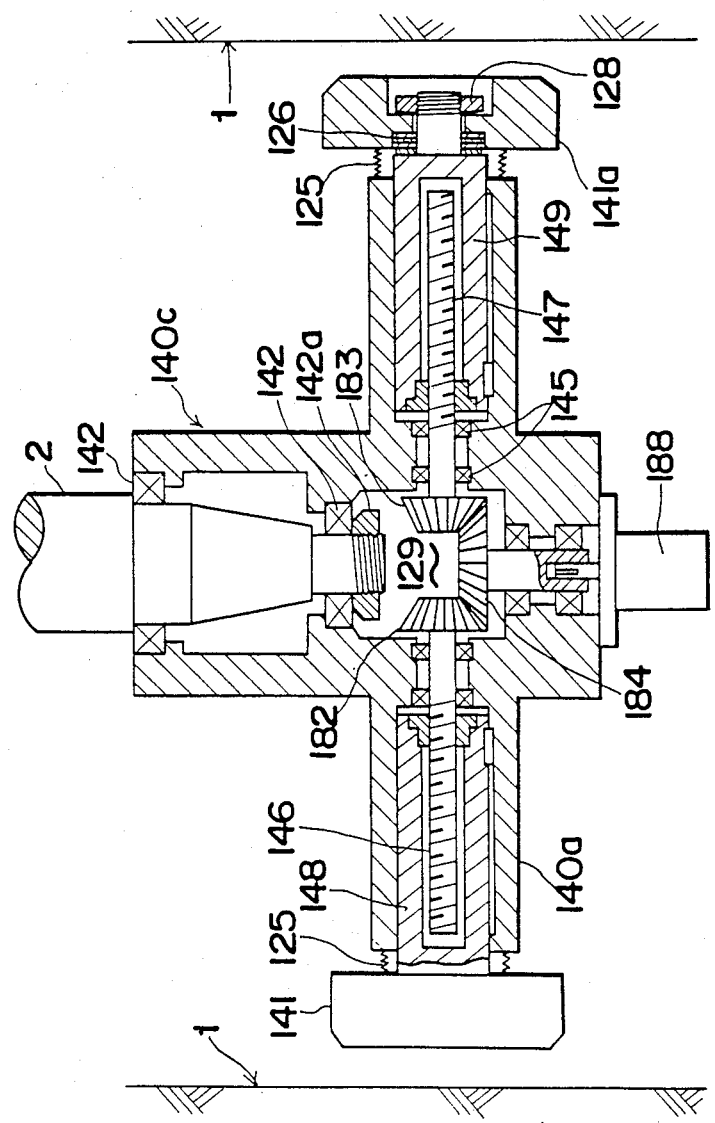

FIG. 11 shows another modified form of the lower support device. The body of the lower support device has an extended upper portion 140c at which the support device is rotatably mounted to the pillar 2. A motor 188 is mounted to the bottom of the body, rotation power from said motor being transmitted via a bevel gear 184 to bevel gears 182, 183 mounted to the respective base portions of the screw shafts 146, 147 respectively. In other respects, this modified embodiment is same as the one shown in FIG. 10.

Where either one of the modified forms illustrated in FIGS. 10, 11 is employed, operation is carried out in the following manner. As FIG. 7 shows, the pillar 2, with the lower support device attached thereto, is lowered into the reactor interior 10 until the body of the lower support device is positioned adjacent the bottom of the reactor interior 10, and then the motor 139 or 188 is driven to rotate the screw shafts 146, 147, whereby the arms 148, 149 are allowed to project so that the support pads 141, 141a are brought into contact with the shield wall 1. The pillar 2 is properly positioned by the support pad 141 being brought into contact with the shield wall 1; and the reaction force resulting from the support pad 141a being brought into contact with the shield wall 1 serves to compress the spring 126, which in turn presses the support pad 141a against the wall 1. Thus, the pillar 2 is securely supported. When this condition has been reached, demolishing operation with respect to the shield wall 1 is commenced.

As described above, according to the second embodiment and modifications thereof, the lower support device 4' can be remotely controlled at the top of the reactor, and this provides an advantage that manual work involved in the setting of the support device 4 as in the first embodiment can be avoided.

Figure 12:
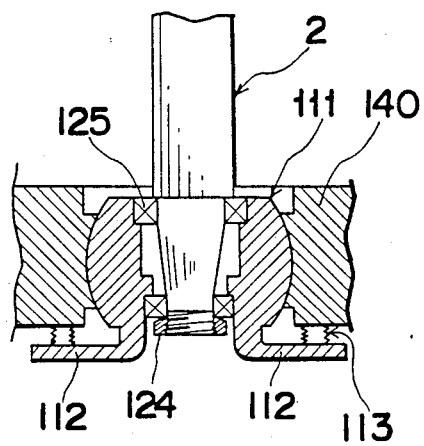

The coupling between the pillar 2 and the lower support device 4' may be effected as shown in FIG. 12.

In a modification shown in FIG. 12, the lower support device has a body 140 and arms projecting therefrom in radially horizontal directions, with a support pad mounted to each of the arms. Points at which the support pads are brought in abutment with the shield wall 1 (not shown) are same as in the case of the modifications shown in FIGS. 10 and 11, but present modification is different from those in FIGS. 10, 11 in mounting arrangement of the body 140 relative to the pillar 2. That is, in the present instance, a spherical bearing 111 having a spherical outer surface if disposed between the body 140 and the pillar 2, said spherical bearing 111 being coupled with the pillar 2 rotatably thereabout through a bearing 125, the body 140 being mounted in position so as to be horizontally inclination variably relative to the spherical bearing 111. At its lower end the spherical bearing 111 has a seat 112 projecting outwardly on which the body 140 is supported in horizontal position through a spring 113 disposed on the seat 112. By arranging the lower support device tiltably relative to the support frame 2 in this way it is possible to absorb a slight inclination, if any, present on the surface of the shield wall 1.

Third Embodiment

In the first and second embodiments, the pillar 2 consists of a single columnar structure, but in a third embodiment shown in FIGS. 13 to 17, the pillar 2 consists of a plurality of columnar structures.

Figure 14:
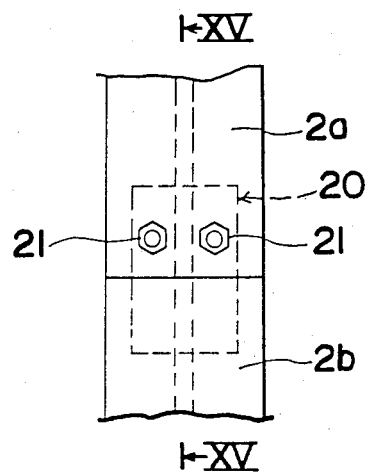
FIG. 14 is a side view showing a coupled portion of the pillar in FIG. 13.
Figure 13:
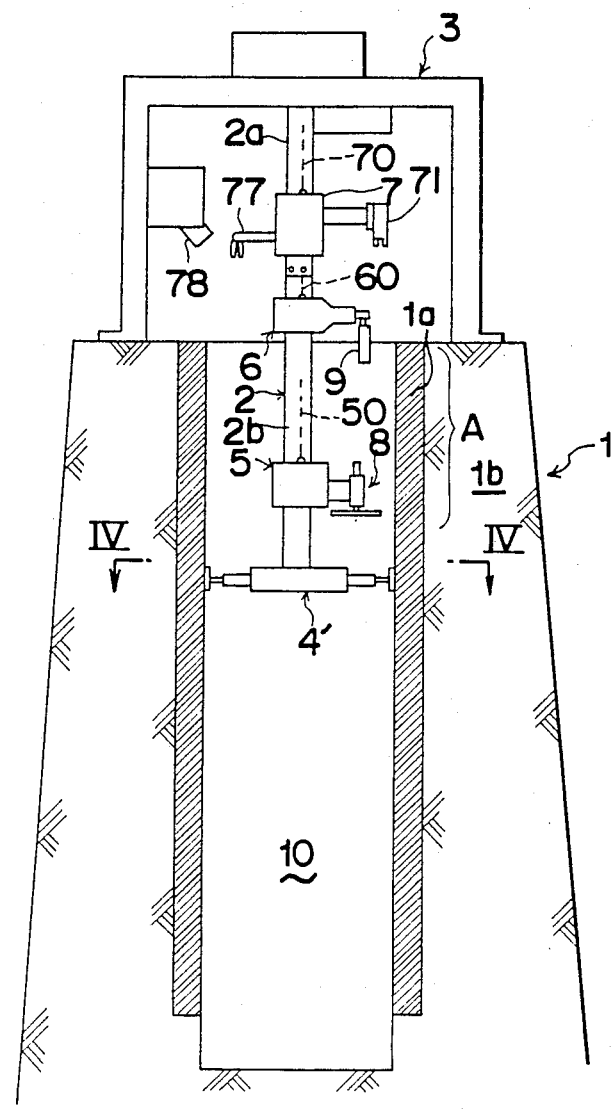
FIGS. 13, 16, and 17 are, respectively, sectional front views showing a reactor shield-wall demolishing apparatus according to a third embodiment of the invention.

FIG. 13 illustrates an arrangement for demolishing an upper area A of the shield wall 1. The pillar 2 consists of an upper pillar 2a and a lower pillar 2b, the two being connected with each other. This joint portion is of such construction as shown in FIGS. 13 and 14. Ribs 20 fixed to an upper end portion of the lower pillar 2b are superposed on the inner surface of a lower end portion of the upper pillar 2a, and the upper and lower pillars 2a, 2b are butt jointed by being fastened by bolts 21. The grip device 7 is on the upper pillar 2a and the cutting devices 5, 6 are mounted on the lower pillar 2b.

Figure 16:
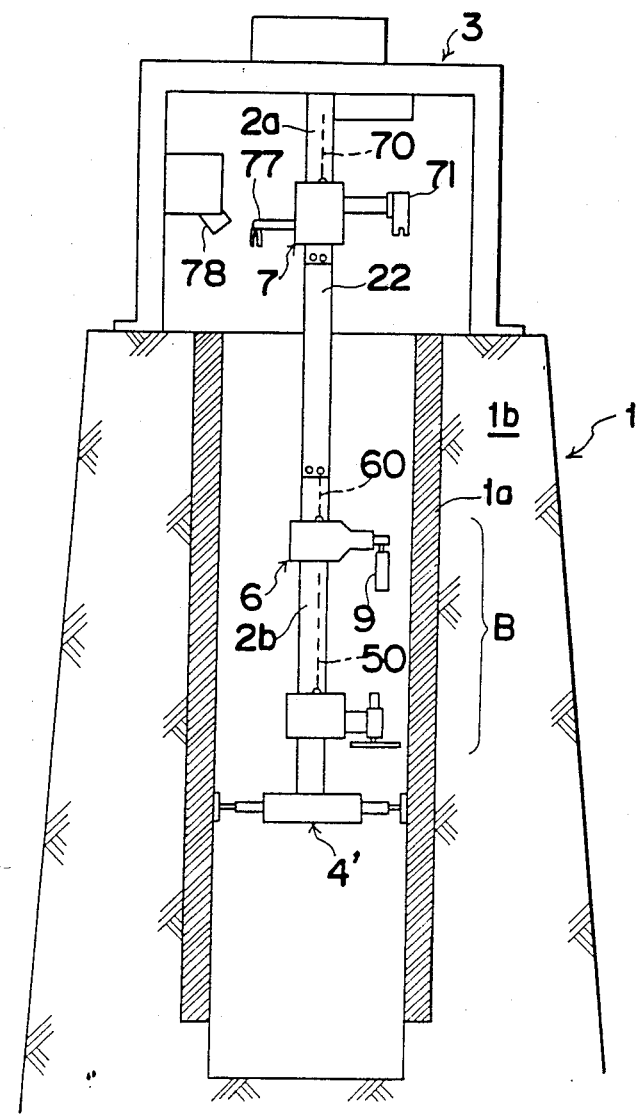

FIG. 16 shows an arrangement for demolishing an intermediate area B of the shield wall 1, wherein an intermediate pillar 22 is connected between the upper pillar 2a and the lower pillar 2b. The intermediate pillar 22 is of same cross sectional configuration as the upper and lower pillars 2a, 2b, and each joint portion between one pillar and another is of same construction as the one shown in FIGS. 13 and 14.

Figure 15:
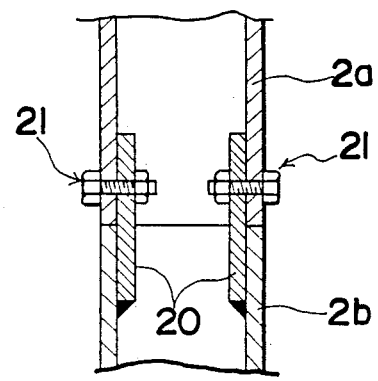
FIG. 15 is a section taken on line XV—XV in FIG. 14.
Figure 17:
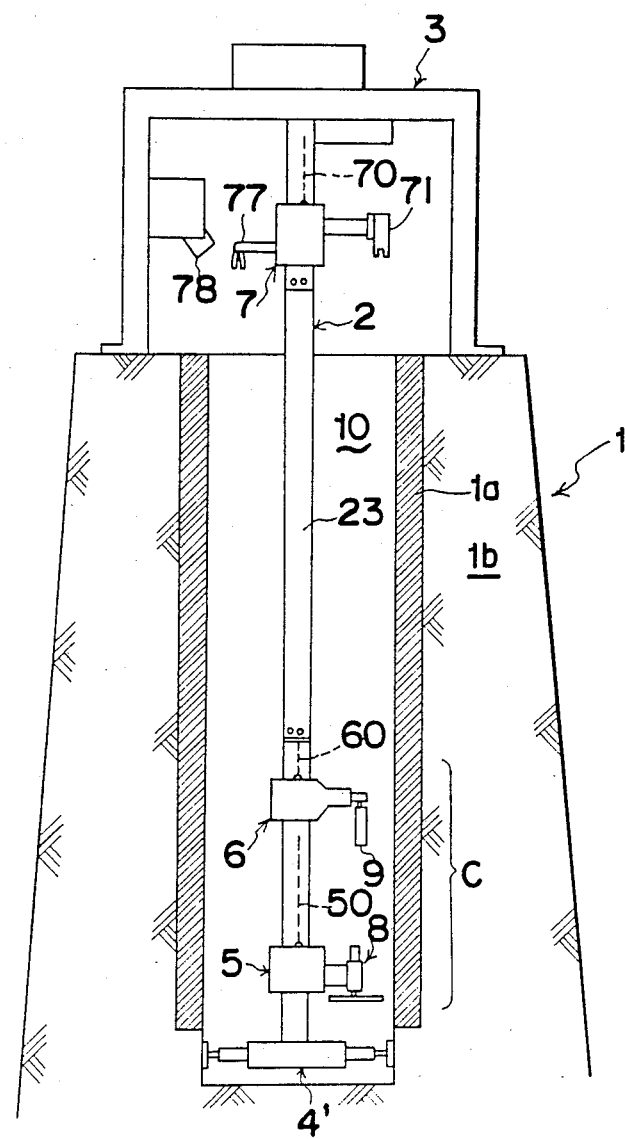

FIG. 17 shows an arrangement for demolishing a lower area C of the shield wall 1, wherein an intermediate pillar 23 longer than the one shown in FIG. 15 is connected between the upper pillar 2a and the lower pillar 2b.

Briefly, in this embodiment, as the demolishing operation proceeds from an upper area of the wall to a lower area, the lower end portion of the pillar is progressively brought downward by adding the intermediate pillar 22 or 23. Accordingly, the cutting devices 5, 6 may be constantly positioned adjacent a level right above the lower support device 4', whereby steady operation of the cutting devices is facilitated. Where the cutting devices are supported by one pillar 2 as in the first and second embodiments, they are positioned about a midpoint of the length of the pillar and are, therefore, rather remote from both the frame 3 and the lower support device 4 or 4', so that any deflection of the pillar 2 may have an unfavorable effect on cutting operation.

Figure 18:
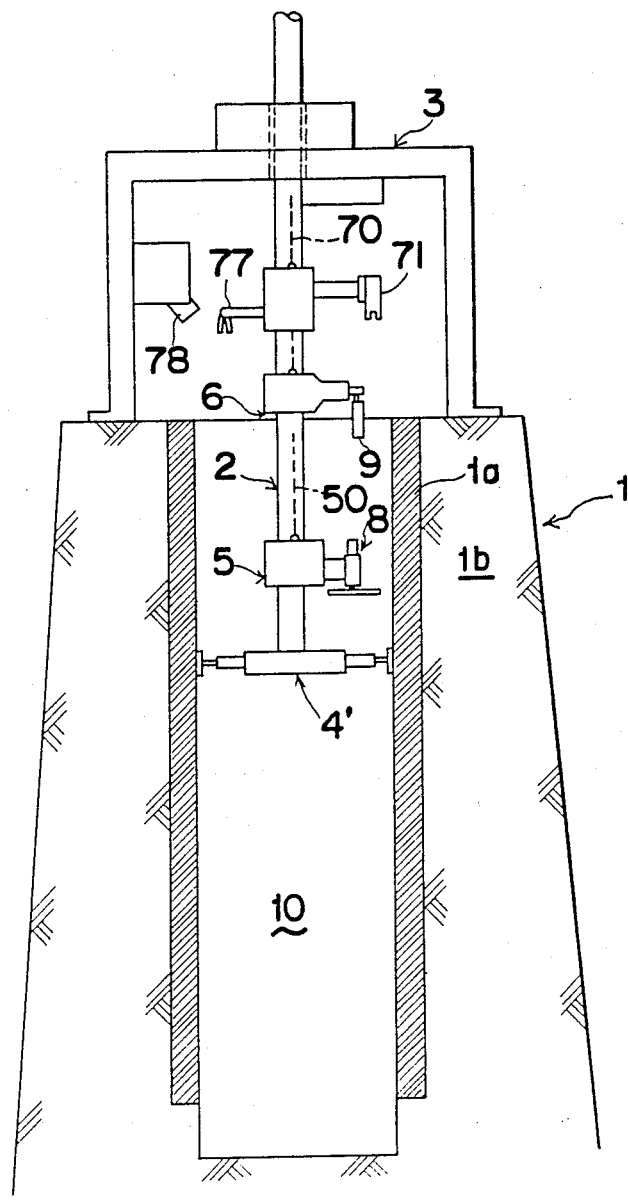
FIG. 18 is a sectional front view showing a modification of the third embodiment.

FIG. 18 shows a modification of the third embodiment. This modification is similar to the first and second embodiments in that the pillar 2 consists of one columnar structure, but is different from them in that the pillar 2 is for upward and downward movement movably supported by the frame 3 so that the length of its downward projection from the frame 3 is adjustable. This modification provides the same advantage as the third embodiment.

Fourth Embodiment

In the above described first to third embodiments, the pillar 2 is supported at two locations, upper and lower, by the frame 3 and the lower support device 4 or 4'. However, as already mentioned, a long pillar 2 may have an unfavorable effect upon cutting operation because of the possibility of the pillar 2 being deflected as the cutting devices 5, 6 are actuated. In this embodiment, therefore, an intermediate support device 4" is provided in addition to the upper and lower support devices 3, 4. The embodiment will now be described in detail with reference to FIGS. 19 and 20.

Figure 19:
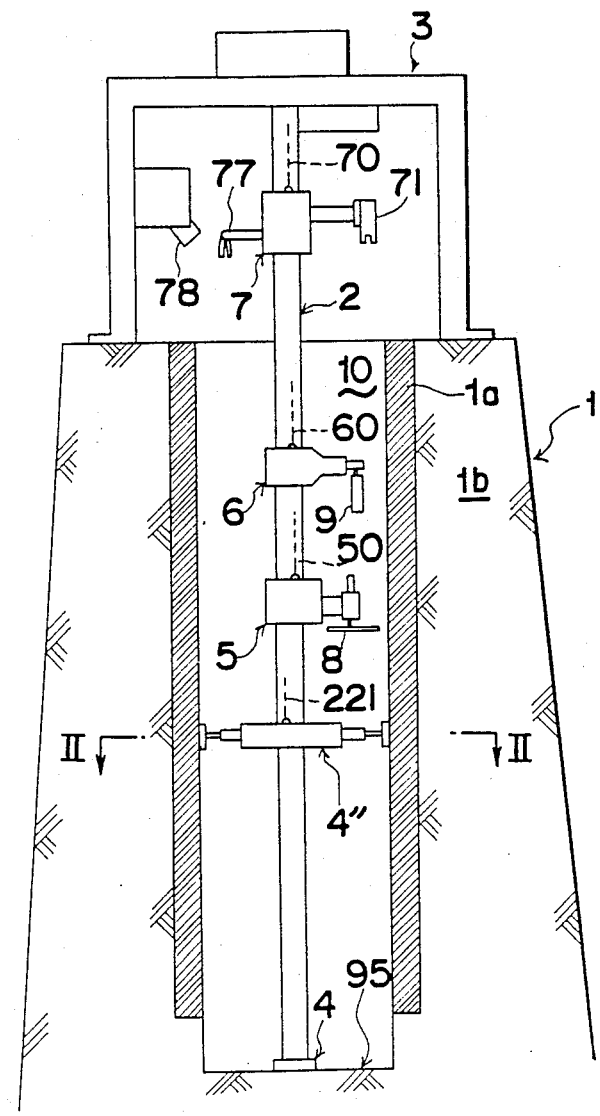
FIG. 19 is a sectional view in front elevation showing a reactor shield-wall demolishing apparatus according to a fourth embodiment of the invention.

As FIG. 19 shows, the embodiment is similar to the first embodiment in that the pillar 2 is supported at it upper portion by the frame 3 and at its lower portion by the lower support device 4.

Figure 20:
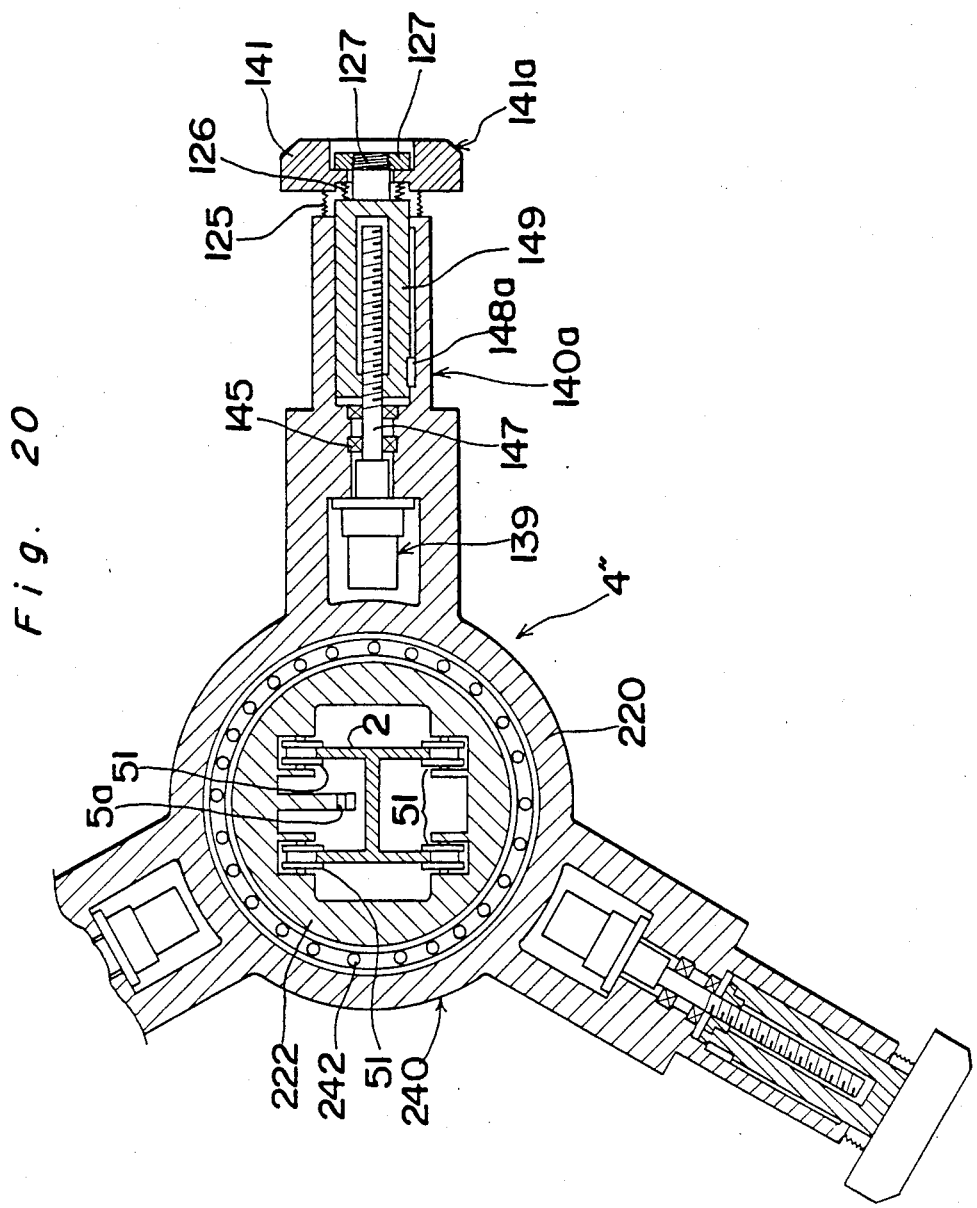
FIG. 20 is a cross sectional view showing an intermediate support device, partly broken away, in FIG. 19.

Details of the intermediate support device are shown in FIG. 20. As shown, this intermediate support device 4" has substantially the same constructional and functional features as the lower support device 4' in the second embodiment. Therefore, parts of same construction as those in FIG. 10 are designated by corresponding reference numerals or characters in FIG. 10 and description of those parts is omitted accordingly.

In this embodiment, the intermediate support device 4" comprises a body 240 and three arms 141 projecting radially from the body 240. The construction of each arm 141 is substantially the same as that of the arms shown in FIG. 10.

The body 240 comprises a cylindrical structure 222 fitted on the outer periphery of the pillar 2 and a three-pronged frame 220 which is rotatably fitted on the outer periphery of the cylindrical structure 222 through a ball bearing 242. In the cylindrical structure 222 there are disposed rollers 51 similar to those described with reference to FIG. 3, said rollers 51 being in roll engagement with the pillar 2, which serves as a rail for the rollers 51. Shown by 5a is a hole for wire connection, a wire 221 being connected to the hole 5a. The wire 221 is wound onto a drum (not shown) similar to the drum 35 described with reference to FIG. 5 for the first embodiment. Accordingly, the intermediate support device 4" may be positioned up and down movably along the pillar 2.

The manner of operation of the intermediate support device 4" is substantially the same as that described with reference to FIG. 10. In this embodiment, a region adjacent the positions of the cutting devices on the pillar 2 is securely supported by the intermediate support device 4", and therefore, the pillar 2 is protected against any deflection, even if any reaction force against cutting acts on the pillar 2 toward deflecting it during cutting operation. Accordingly, cutting operation may be carried out accurately and efficiently.

In the embodiment illustrated in FIG. 19, the lower support device is identical with the one employed in the first embodiment; but alternatively, the lower support device 4' described in the second embodiment may be employed.

Fifth Embodiment

The above described first to fourth embodiments are intended for use in demolishing a reactor having a comparatively small diametral size. In the case of demolishing a reactor of a larger diametral size, however, the distance between the pillar positioned centrally in the reactor and the inner wall of the reactor is quite large and, therefore, cutting operation by means of the cutting devices will be unsteady and virtually impossible when the apparatus according to any of said embodiments is employed.

In the fifth embodiment, therefore, a construction suited for use in demolishing a reactor having a larger diametral size is employed. Such construction will be described in detail with reference to FIGS. 21 to 27, inclusive.

Figure 21:
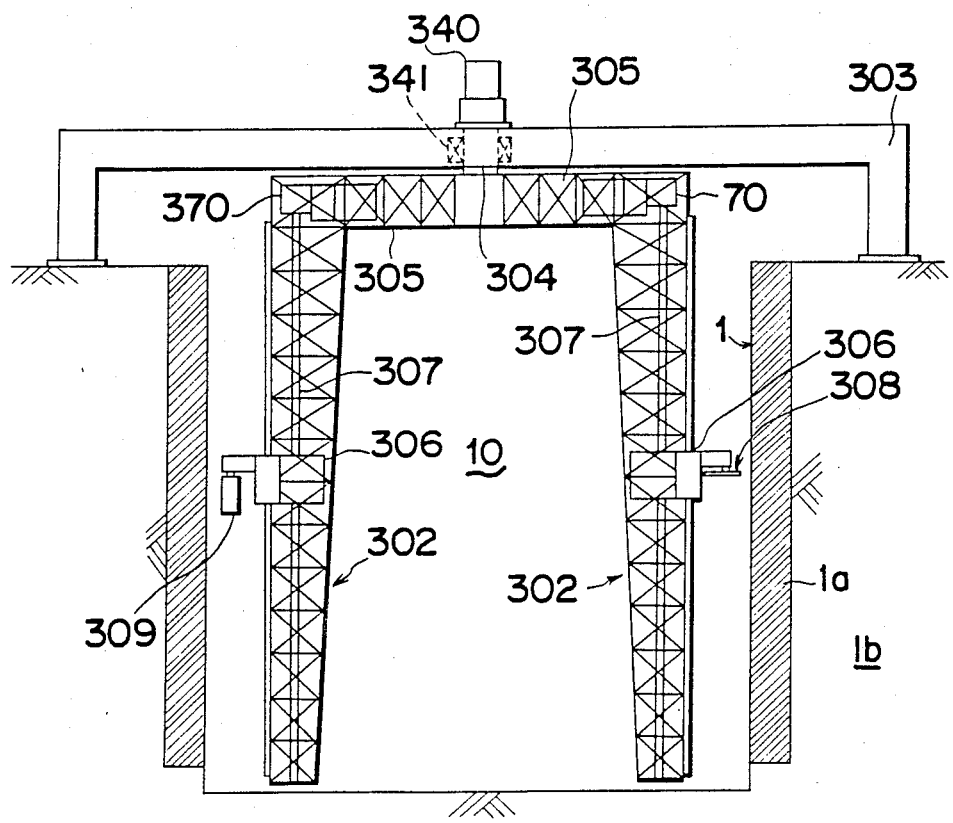
FIGS. 21 and 22 are, respectively, a front sectional view and a plan view, both showing an apparatus according to a fifth embodiment.
Figure 22:
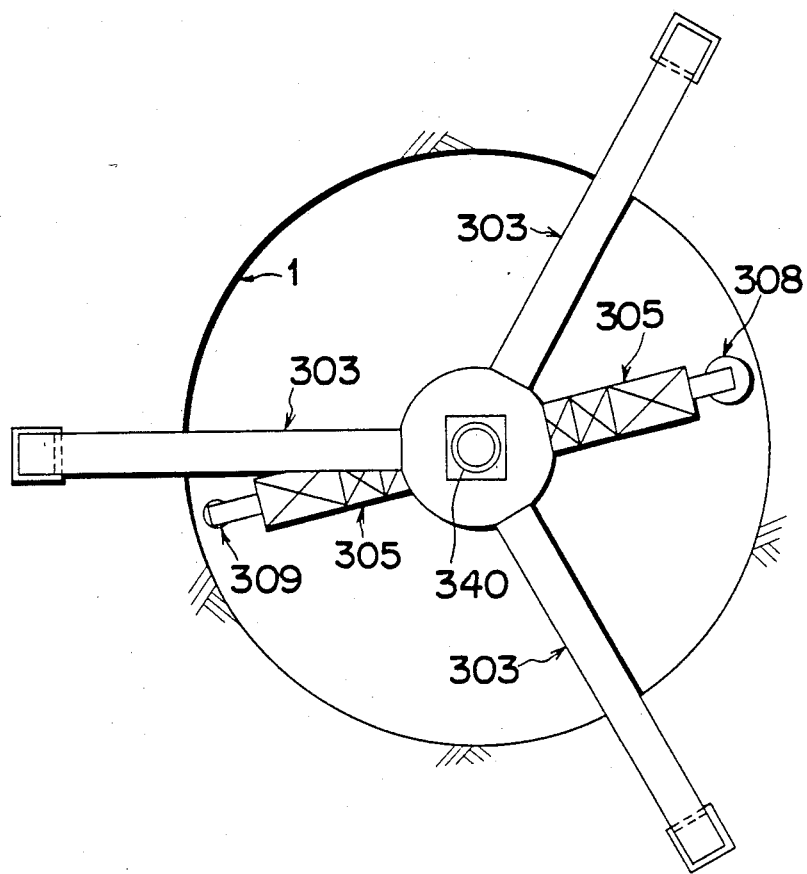

Referring to FIGS. 21 and 22, and upper support device or a three-pronged frame 303 is disposed on the top edge portion of the shield wall 1 in such manner as to cover the frame 303 so that it is positioned above the reactor at the center thereof. The rotary shaft 304 is rotatably supported by a bearing 341 disposed in the frame 303 and is powered by a motor 340. Arms 305 extending radially toward opposed sides of the reactor interior 10 are connected to the lower end of the rotary shaft 304, and the respective upper ends of the arms 305 are connected to respective upper ends of two pillars vertically disposed along the shield wall 1.

In each of the pillars there is disposed a screw shaft 307 extending longitudinally, a motor 370 being disposed at the upper end of the screw shaft 307 for actuating the shaft 307 to rotate; these members constitute a drive means for upward and downward movement of cutting devices 306. The cutting devices 306 each is in threaded engagement with one or the other of the screw shafts 307 so that it is moved upward and downward along one or the other of the pillars 302 as the screw shaft 307 is rotated, as will be described hereinafter. In this embodiment, the pillars 302, to each of which one cutting device 6 is mounted, are two in number; but the number of cutting devices may be determined as desired.

Figure 23:
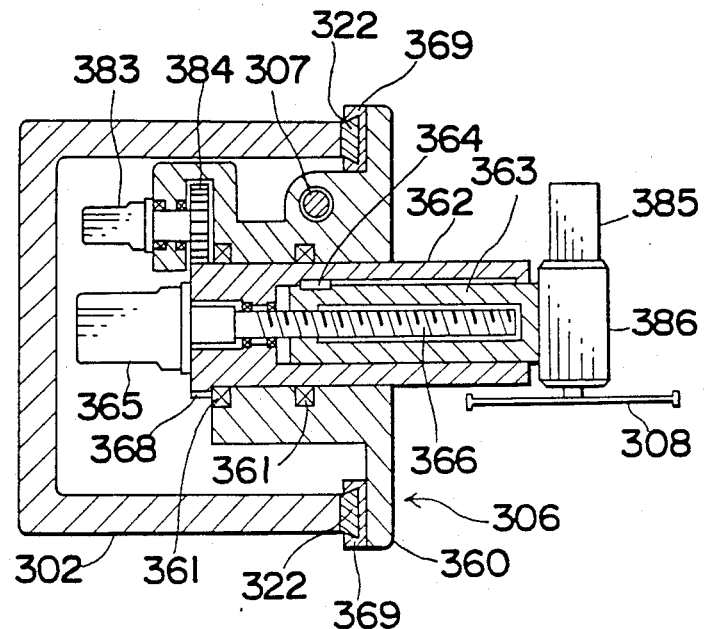
FIGS. 23 and 24 are, respectively, sectional views showing the cutting devices in FIG. 21.

Each cutting device 6 is of such construction as illustrated in FIG. 23. The body 360 of the cutting device 306 rotatably supports therein a cylindrical holder 362 through a bearing 361. In this holder 362 there is housed an arm 363 which is prevented from rotation by a slide key 364 and which is therefore movable in the axial direction only. A screw shaft 366 connected directly to a motor 365 mounted to one of the holder 362 is threadedly fitted in the arm 363 so that the arm 363 is moved axially as the screw shaft 366 is rotated. A rotational force transmission mechanism 386 which transmits rotational force from a motor 385 to a cutter blade 308 is mounted to the front end of the arm 308.

A motor 383 is mounted to the end of the body 360. A pinion 384 coupled directly to the motor 383 is in mesh with a gear 368 formed on the outer periphery of the end of the holder 362, whereby the holder 362 is rotatable for orienting the cutting blade 308 in vertical or horizontal directions. Slide members 369 mounted to both sides of the body 360 integrally therewith are slidably in engagement with a rail fixed to the end of one of the pillars 302, and the cutter device 306 is in threaded engagement with the screw shaft 307. The body 360 is thus upwardly and downwardly movable along the rail 222.

Figure 24:
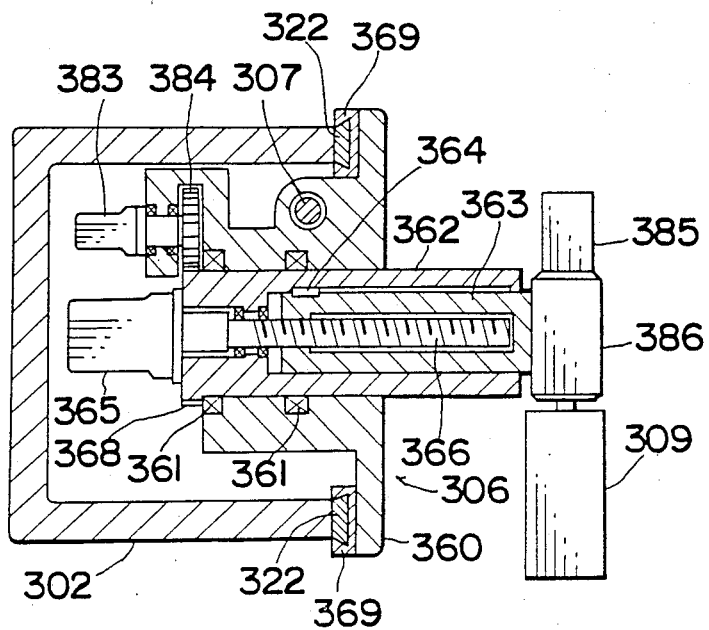

As FIG. 24 shows, a core bit 309 is mounted to one cutting device 306 of a similar construction. However, unlike the cutter blade 308, the core bit 309 is disposed in a downward facing manner and, therefore, the cutting device which holds a core bit 309 may not be provided with a motor 383 and a pinion 384.

According to the above described arrangement, the pillars 302 may be moved towards the shield wall 1 as desired.

Figure 25:
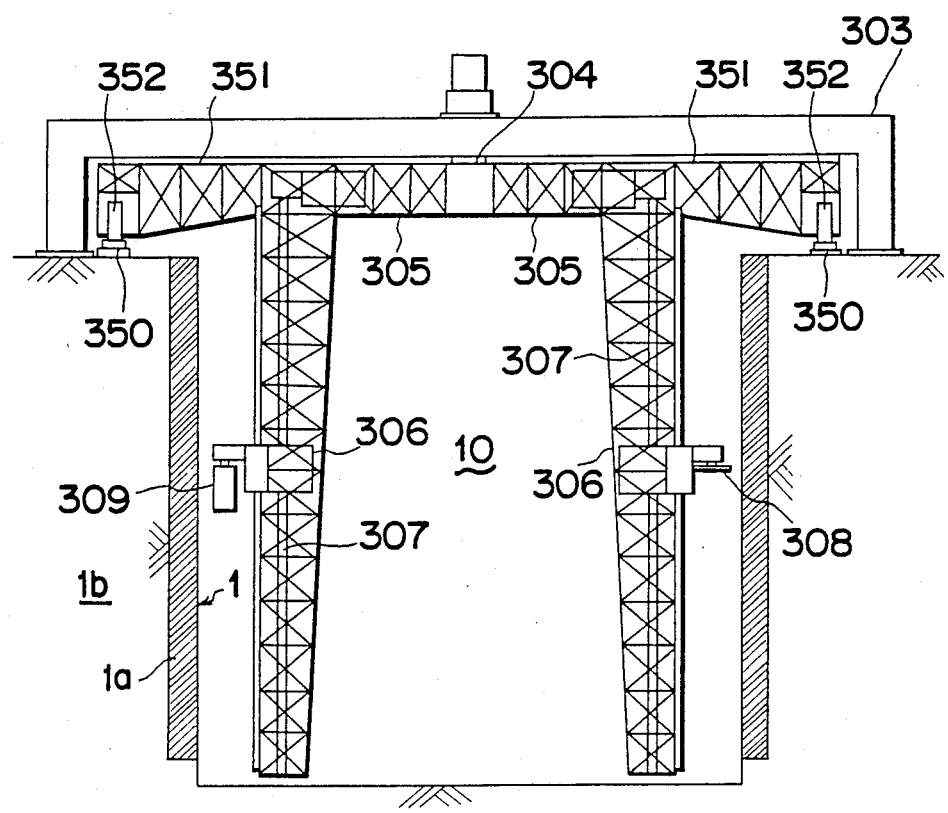
FIGS. 25 and 26 are, respectively, a sectional front view and a plan view showing a modification of the fifth embodiment.
Figure 26:
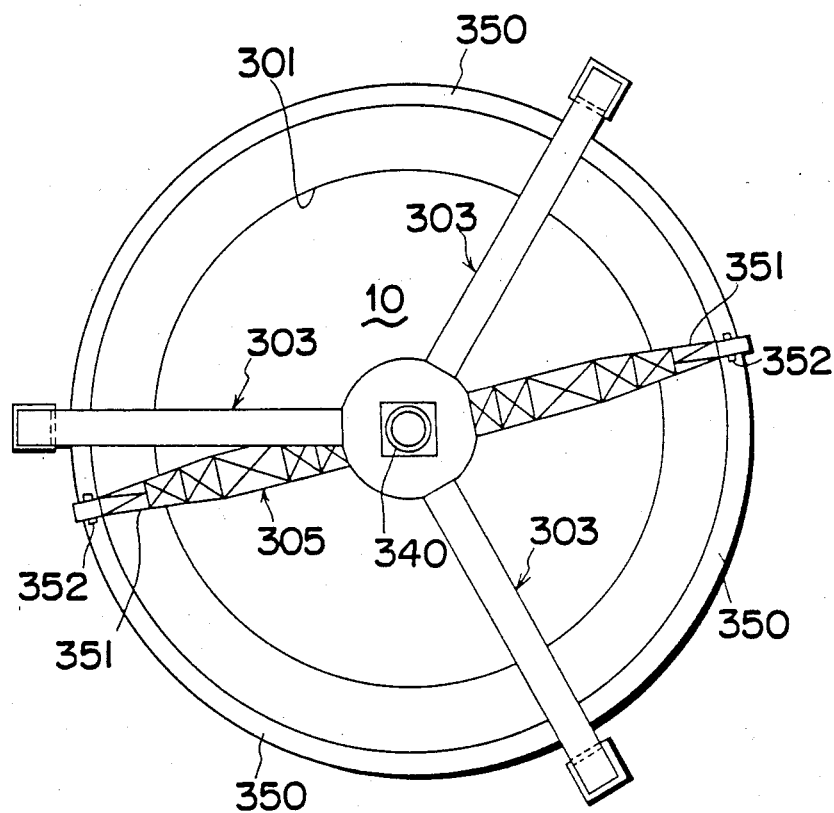

FIGS. 25 and 26 show a modification of the fifth embodiment. On the upper edge side of the reactor there is installed a circular rail coaxial with the reactor interior 10. The arms 305 each is provided with an extension 351 which extends to a level above the rail 350, there being provided at the lower side of the extension 351 a wheel which is in rolling engagement with the rail 350 for movement thereon. Through such arrangement the load of the pillar 302 can be shared between it and the rotary shaft 304 so that the pillar 302 is steadily supported.

Figure 27:
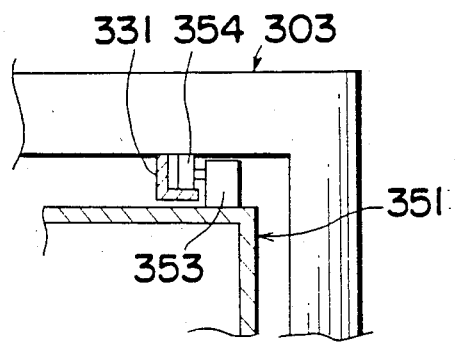
FIG. 27 is a partially sectional view showing another modification thereof.

FIG. 27 shows another modification. This modification is similar to the above described one in that each arm 305 is provided with an extension 351, but is different from the latter in that the frame 303 is provided with a rail 331, and in that a wheel 354 is mounted to a protrusion formed on the extension 351 so that the wheel is movable on the rail 331 in roll engagement therewith.

In the above described modification, one cutting device for mounting the cutter blade 308 and another cutting device for mounting the core bit 309 are separately mounted to the pillars 302; alternatively, cutter blade 308 and core bit 309 may be mounted to the front end of the arm of one cutting device alternatively and in exchange for each other so that cutting operation is carried out by alternatively using the cutter blade 308 and the core bit 309.

The individual motors are remotely operated. The monitoring of each process of operation may be performed by means of a TV camera disposed at a suitable location as earlier described.

Next, the manner of operation of the individual devices will be described hereinbelow. Cutting operation for separation of the surface layer 1a from the inner wall portion 1b is carried out by actuating the cylindrical core bit 309 of the cutting device 306 to cut a continuous series of holes, then removing columnar pieces in individual holes by means of a suitable grip device (not shown), thereby forming the continual series into slits. Subsequently, cutter blade 308 is operated to form longitudinal and transverse slits and blocks thus cut out are gripped and transported upward by another grip device (not shown) for removal. The aforesaid grip devices may be mounted to suitable devices up and down movable along the pillars 2. Alternatively, they may be operated while being hung by a crane or the like from a level above the reactor interior 10.

In the above described process of operation, positioning and orientating of the cutter blade 308 is carried out by setting three factors: height, length of axial projection from the pillar 2, and longitudinal or horizontal orientation. In FIGS. 21 and 24, motor 370 is driven to rotate screw shaft 307, thereby to move the body which is in thread engagement with the screw shaft 307 to the required level, then motor 365 is driven to rotate screw shaft 366, thereby to cause the arm 384 to project over the required distance, the motor 383 is driven to orient cutter blade 308 in the required direction, and then motor 385 is driven to rotate cutter blade 308 for cutting the shield wall 1. Forming a longitudinal slits is carried out by moving the body 360 upward and downward, while forming of horizontal slits is carried out by moving the pillar 2 through arm 305 by driving motor 340. Positioning of core bit 9 is carried out in same manner as described above.

In the above described arrangement, a rack may be provided in place of the screw shaft 307, with a pinion, which is in mesh with the rack, provided in the body 360 of the cutting device, so that the cutting device 306 is moved by driving the pinion to rotate. Each arm 305 may be made telescopic or otherwise so that position adjustment for the arm 305 is effected by stretching and contracting the arm 305.

As above mentioned, each pillar 302 which movably supports a cutting device is swingable and movable along the inner wall; therefore, if the reactor interior 10 is of a larger diameter, the swinging radius of the pillar 302 may be increased accordingly and the cutting device itself need not be of a larger size. This permits compact construction of the apparatus. Since each cutting device is movable along the inner surface of the shield wall, the cutting operation can be performed efficiently. If a plurality of cutting devices are arranged along the inner periphery of the wall for simultaneous cutting operation, operation efficiency may be further improved. Furthermore, no manual operation in the reactor is required.

Sixth Embodiment

A sixth embodiment is shown in FIGS. 28 to 32, inclusive. This embodiment is different from the fifth embodiment in the mode of swinging of arms 305 and the manner of mounting of pillars 302 relative to arms 305. The embodiment will be described in detail hereinbelow.

Figure 28:
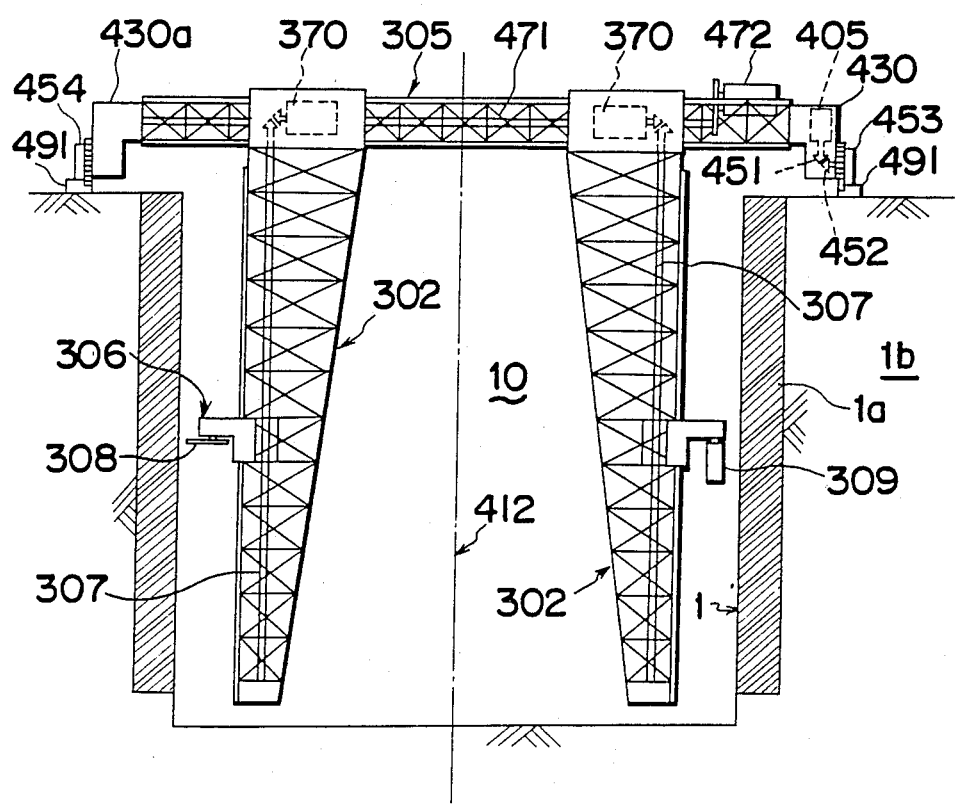
FIGS. 28 and 29 are, respectively, a sectional front view and a plan view, both showing a sixth embodiment of the invention.
Figure 29:
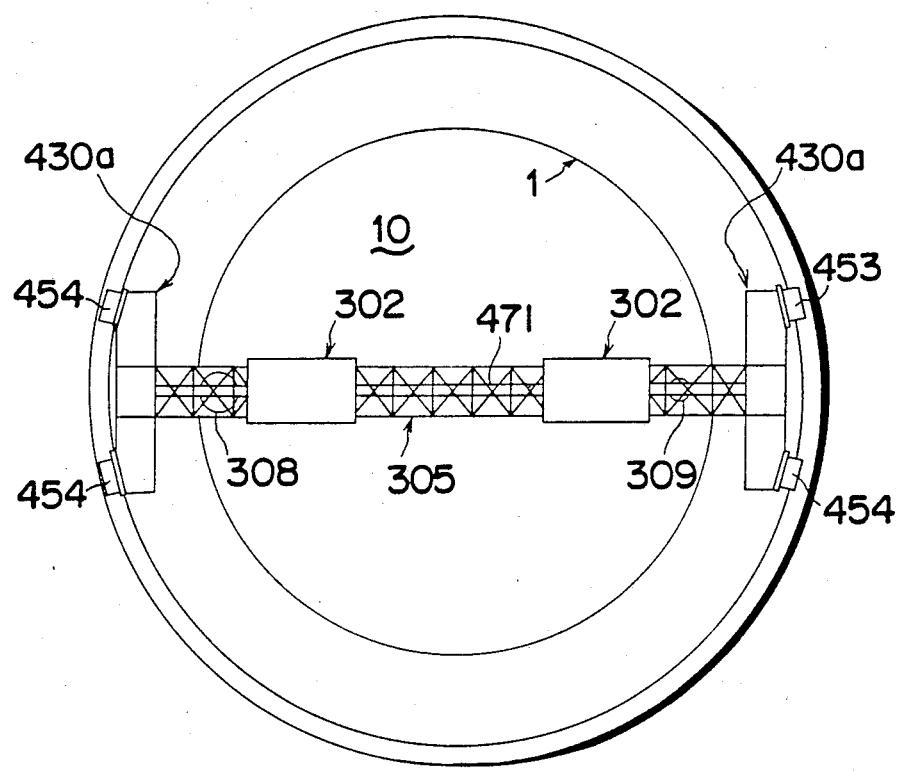

Referring to FIGS. 28 and 29, there is provided a circular guide rail 491 coaxial with the reactor interior 10 on the upper edge side of the reactor. An upper support device or arm 305 is disposed at a level above the reactor interior 10, there being mounted to the arm 305 at its one end 430 one drive wheel 453 and one driven wheel 454, and at its other end 430a a pair of driven wheel 454. The arm 305 is supported by the wheels 453, 454 at more than two locations on the circular guide rail 491 and is movable on the guide rail 492 in rolling engagement therewith so that the arm 305 is rotatable or swingable around the center line 412 of the reactor interior. A motor 405 is mounted in the one end 430 of the arm 430 so that rotation force from the motor 405 is transmitted to the drive wheel 453 via gears 451, 452. The wheel 453, 454 may be simply in surface contact with the guide rail 491; alternatively, a portion of the guide rail 491 is provided with a rack and at least one of the wheels is provided with a pinion so that roll movement may be accurately performed.

In the reactor interior 10, a pair of pillars 302 are disposed which extend vertically along the shield wall 1, the upper end of each pillar 302 being slidably connected to the arm 305 so that the pillar 302 is securely supported by the arm 305. In each pillar 302 there is disposed a longitudinally extending screw shaft 307, and in an upper end portion of the pillar 302 there is provided a motor 370 for driving the screw shaft 307 to rotate; these members constitute drive means for a cutting device 306. The or each cutting device 306 is in threaded engagement with the screw shaft 307 is movable upwardly and downwardly along the pillar 302 through the rotation of the screw shaft 307, as will be further described hereinafter. A longitudinally extending screw shaft 471 is disposed in the arm 305, at one end of which there is disposed a motor 472 which actuates the screw shaft to rotate; these members constitute drive means for the or each pillar. The upper end of the pillar 302 is in threaded engagement with the screw shaft 471, so that the pillar 302 is movable along the arm 305 through the rotation of the screw shaft 471.

In this embodiment, pillars 2 and cutting devices 6 which sreve as demolishing means are provided such that there are two of each; but only one support pillar 302 may be provided instead of two. Also, it is possible to arrange that a plurality of cutting devices are provided relative to the only one pillar 302.

Figure 30:
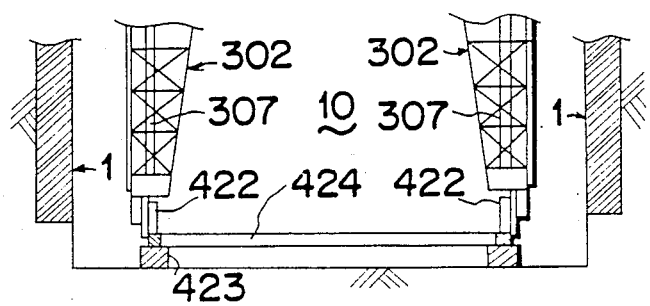
FIGS. 30 and 31 are, respectively, sectional views in front elevation showing respective lower portions of modification of the pillars according to the sixth embodiment.

FIG. 30 shows a modification of the sixth embodiment, wherein a circular pedestal 423 coaxial with the reactor interior 10 and a rail 424 mounted thereon are provided at the bottom of the reactor interior 10 and wheels 422 are provided at the respective lower ends of pillars 302, so that the wheels 422 are moved on the rail 424 in roll engagement therewith when the pillars 302 are swinged, whereby the weight of the support pillars 302 are received by the rail 424. In this way, by arranging so that the pillars 302 are supported not only at the side, but also at the bottom side is it possible to steadily support the cutting devices 6 so that the process of cutting operation, which will be described hereinafter, may be accurately performed.

Figure 31:
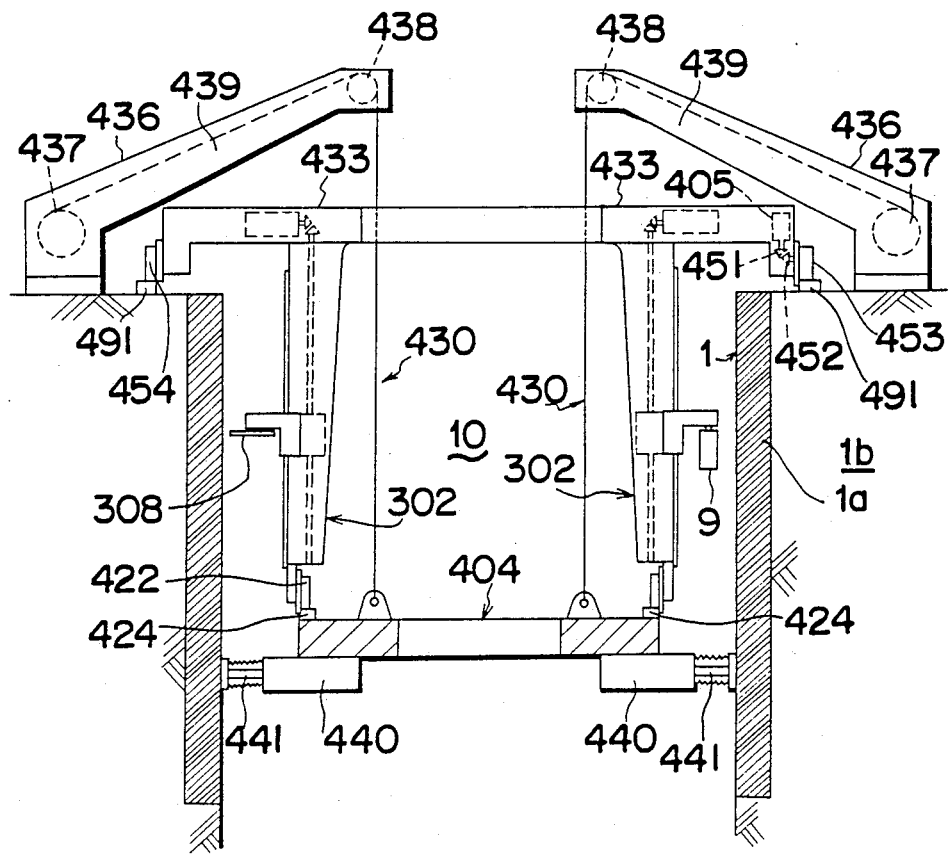
Figure 32:
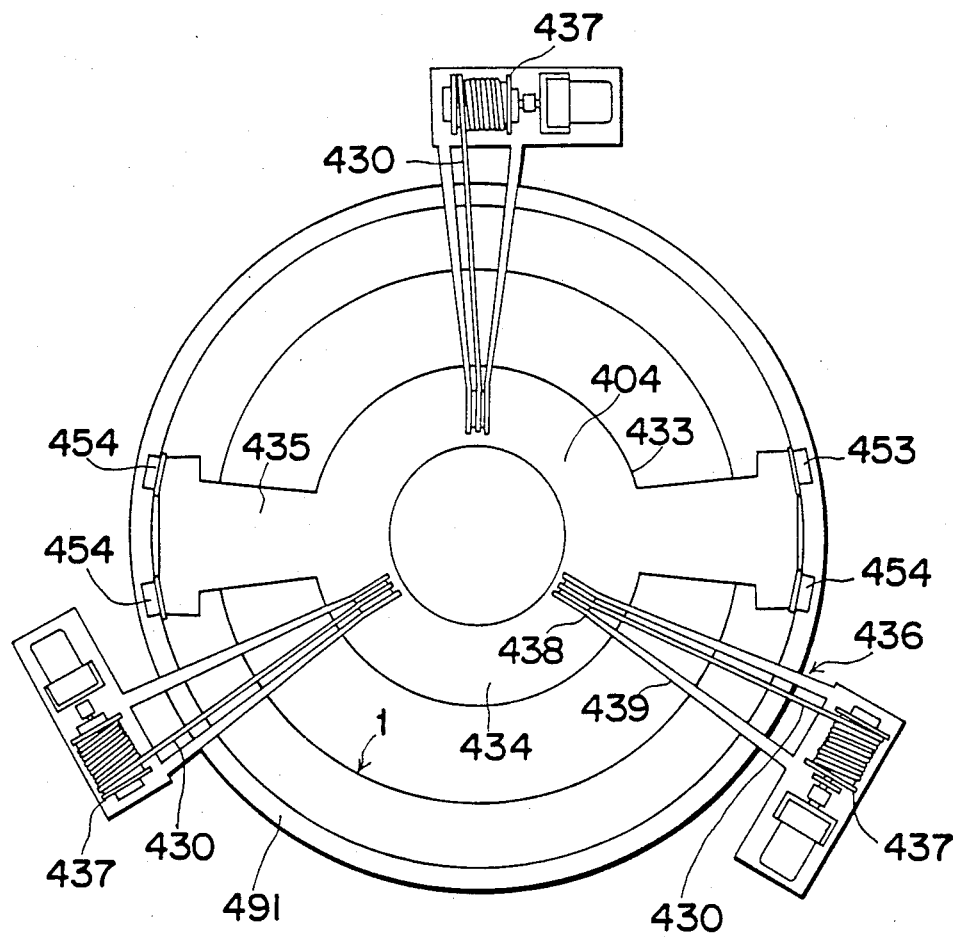
FIG. 32 is a plan view of the modification as shown in FIG. 31.

FIGS. 31 and 32 show a further modification. At the top side of the reactor interior there is disposed an arm 433 having a central portion 434 of torus configuration so that wheels 453, 454 provided at the lower ends of both side portions are movable on a rail 491 in roll engagement therewith. As in the foregoing modification, the rotational force from a motor 405 is transmitted to the drive wheel 453 through wheels 451, 452. A plurality of suspension devices 436 (three in this embodiment) are disposed outside the guide rail 491, by which suspension devices of an annular base 404 is suspended through a wire 430 for level placement in the reactor interior 10. Each suspension device 436 has an arm 439 extending to a level above the reactor interior 10 and a drum on which wire 430 is wound, the wire 430 from the drum 437 beind paid out through a pulley 438.

Hydraulic cylinders 440 are mounted to the lower side of the base 404, and from the cylinders arm 441, each consisting of a piston rod projected radially in horizontal directions, the respective front ends of which arms are in abutment with the shield wall 1, whereby the base 4 is fixed in position. On the base 404 there are provided rails 424 on which the wheels 424 on the lower ends of pillars 302 are movable in roll engagement of the rails, whereby the lower ends of the pillars 302 are supported in position. Where such base 404 suspended from above is utilized in laying rails thereon, there is an advantage that no operator is required to enter the reactor interior for placement of rails.

Figure 33:
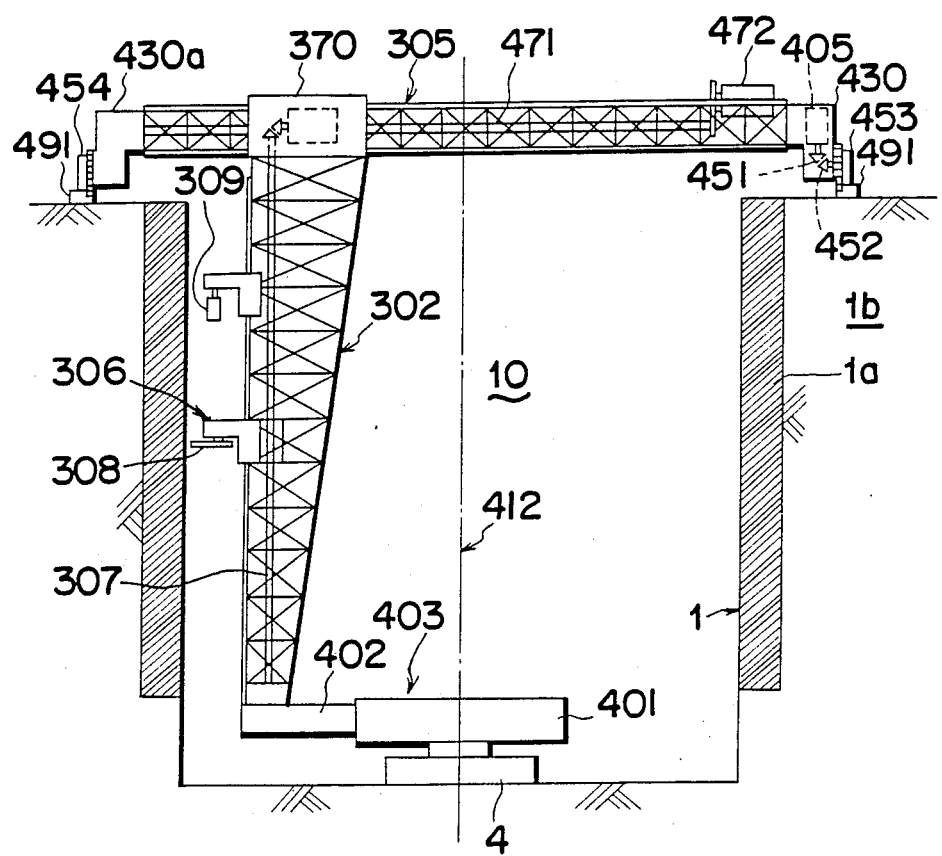
FIGS. 33 and 34 are, respectively, sectional front views showing further modifications of the sixth embodiment.

FIG. 33 shows a further modification. In the modification, only one pillar 302 is provided and it is supported at its lower end by lower support device 4 at the bottom of the reactor.

At the lower end of the pillar 2 there is connected thereto a projectable support device 403 consisting of a piston rod 402 and a cylinder 401, for example. More specifically, the front end of the piston rod 402 is fixed to the lower end of the pillar 2. The cylinder 401 is rotatably mounted on the lower support device 4 which similar in construction to the one described in the first embodiment. Accordingly, the pillar is movable as desired in horizontal directions. Furthermore, since the pillar is supported by both the upper and lower support devices, accurate cutting operation by cutting devices 308, 309 can be assured.

Figure 34:
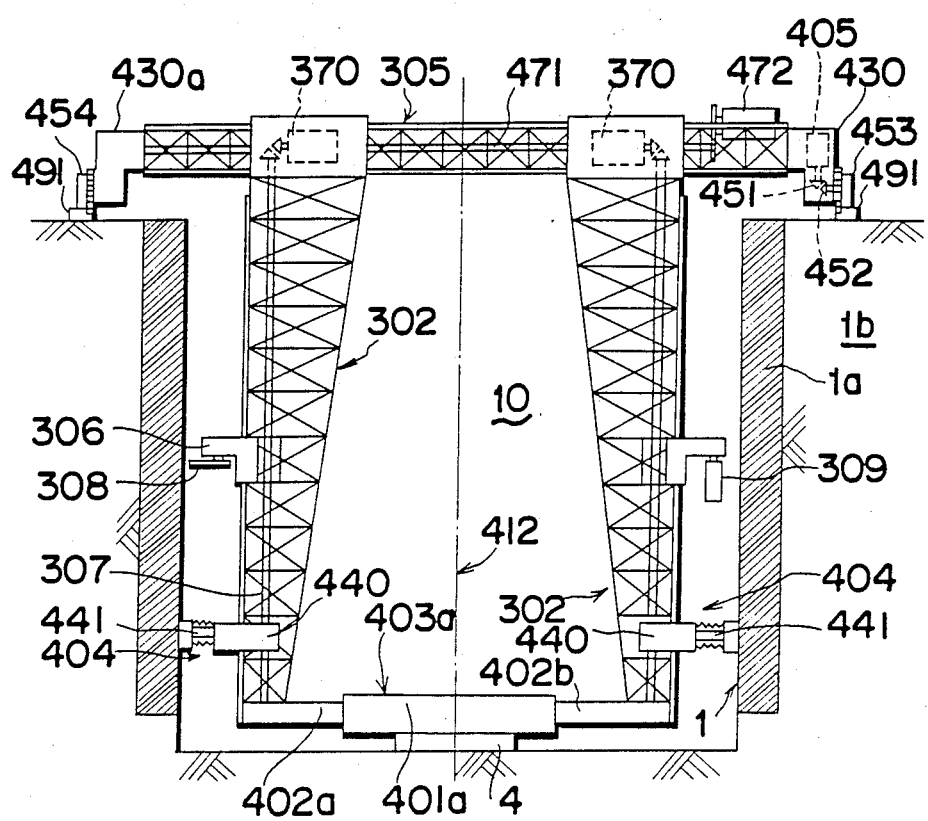

FIG. 34 shows a further modification. In this modification, a pair of pillars 302 are employed as in the case of the sixth embodiment shown in FIG. 28, and two pillars 302 are supported at their lower ends by a lower support device 4 through a stretchable support device 403a.

That is, a cylinder 401a is rotatably mounted on the lower support device 4, and piston rod 402a, 402b project from both sides of the cylinder 401a, the respective ends of the piston rods 402a, 402b being fixed to the respective lower ends of the pillars 302. Accordingly, both pillars are movable in horizontal directions. In this embodiment, an intermediate support device 404 is mounted to each pillar 302. This intermediate support device may be of the same construction as those 440, 441 shown in FIG. 31. The intermediate support device 404 is moved up and down along each pillar 302 by an elevating device not shown.

Seventh Embodiment

Figure 35:
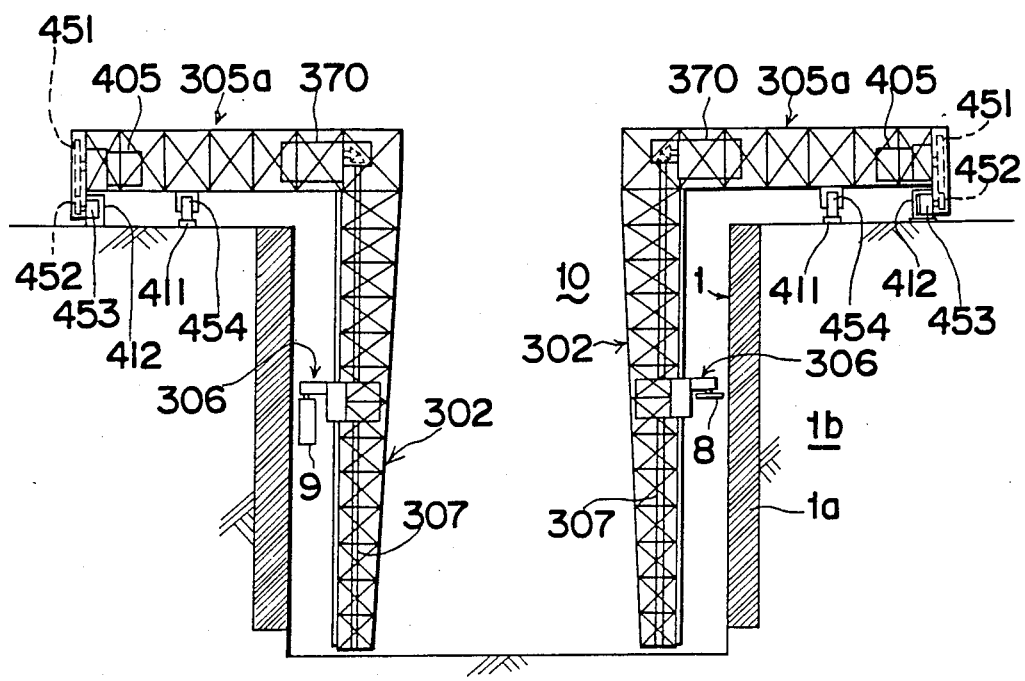
FIGS. 35 and 36 are, respectively, a front sectional view and a plan view, both showing a reactor shield-wall demolishing apparatus according to a seventh embodiment.
Figure 36:
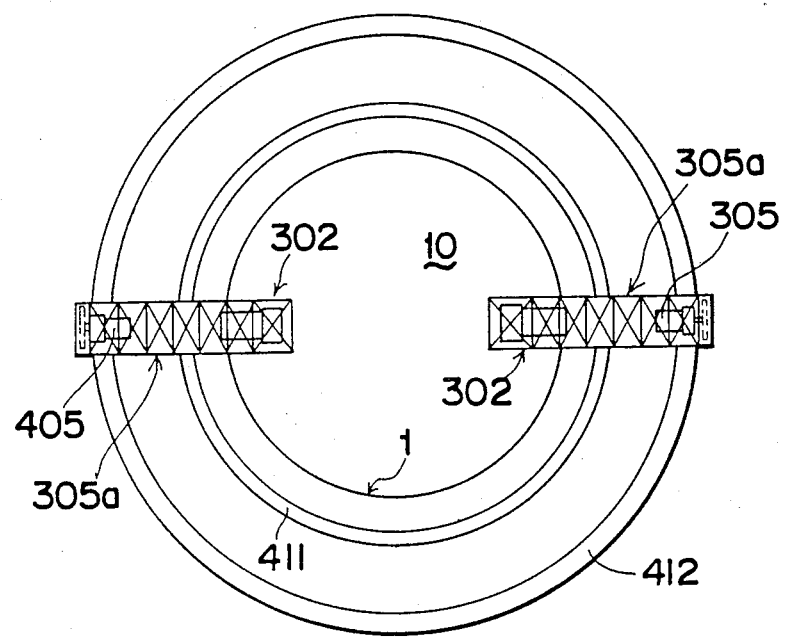

A seventh embodiment is shown in FIGS. 35, 36. This embodiment is characterized in that pillars 302 are swingable while being overhung on the outer periphery side of the reactor. The embodiment will be described in detail hereinbelow. It is noted that parts identical with those in the FIG. 28 embodiment are designated by identical reference numerals.

Referring to FIGS. 35 and 36, there are disposed an inner circular guide rail 411 and an outer guide rail 412, both coaxial with the reactor interior 10 at the upper edge side of the shield wall 1. The outer guide rail 412 is C-shaped in its vertical section and is adapted to receive upward force from wheels (which will be described hereinafter). On the guide rails 411, 412 there is disposed an upper support device or arm 305 which is movable thereon. The arm 305a has a motor 405 therein which serves as drive means for it. On the lower side of the arm 305 there are disposed a driven wheel 454 movable on the rail 411 and a drive wheel 453 movable on the rail 412. Rotational power from a motor 405 is transmitted to the drive wheel 453 through a pinion 452, whereby the arm 305a is self-movable along the rails 411, 412.

In the reactor interior 10, pillars 302 are disposed and extend generally vertically along the shield wall 1, the respective upper ends of the pillars 302 being connected to upwardly extending projections formed at the respective ends of the arms 305. Since the pillars 302 are fixed to the reactor interior side ends of the arms 305a, some upward force is exerted on the other ends of the arms 305a; but such force is received by the rail 412, which is U-shaped. Cutting devices 306 are mounted to the support pillars 302, and vertically extending screw shafts 307 are disposed, on each, in the pillars 302, drive motors 370 being disposed at the respective upper ends of the pillars for driving the screw shafts 307: these members constitute drive means for the cutting devices 6. That is, the cutting devices 306, each of which is in thread engagement with one screw shaft 7, are movable upwardly and downwardly along pillars 302 through rotation of the motors 307.

This embodiment also permits swinging of the shafts 302, with cutting devices 306 mounted thereon, along the surface of the shield wall 1, and accordingly it can be advantageously employed in demolishing a reactor having a larger diametrical size.

Eighth Embodiment

Figure 37:
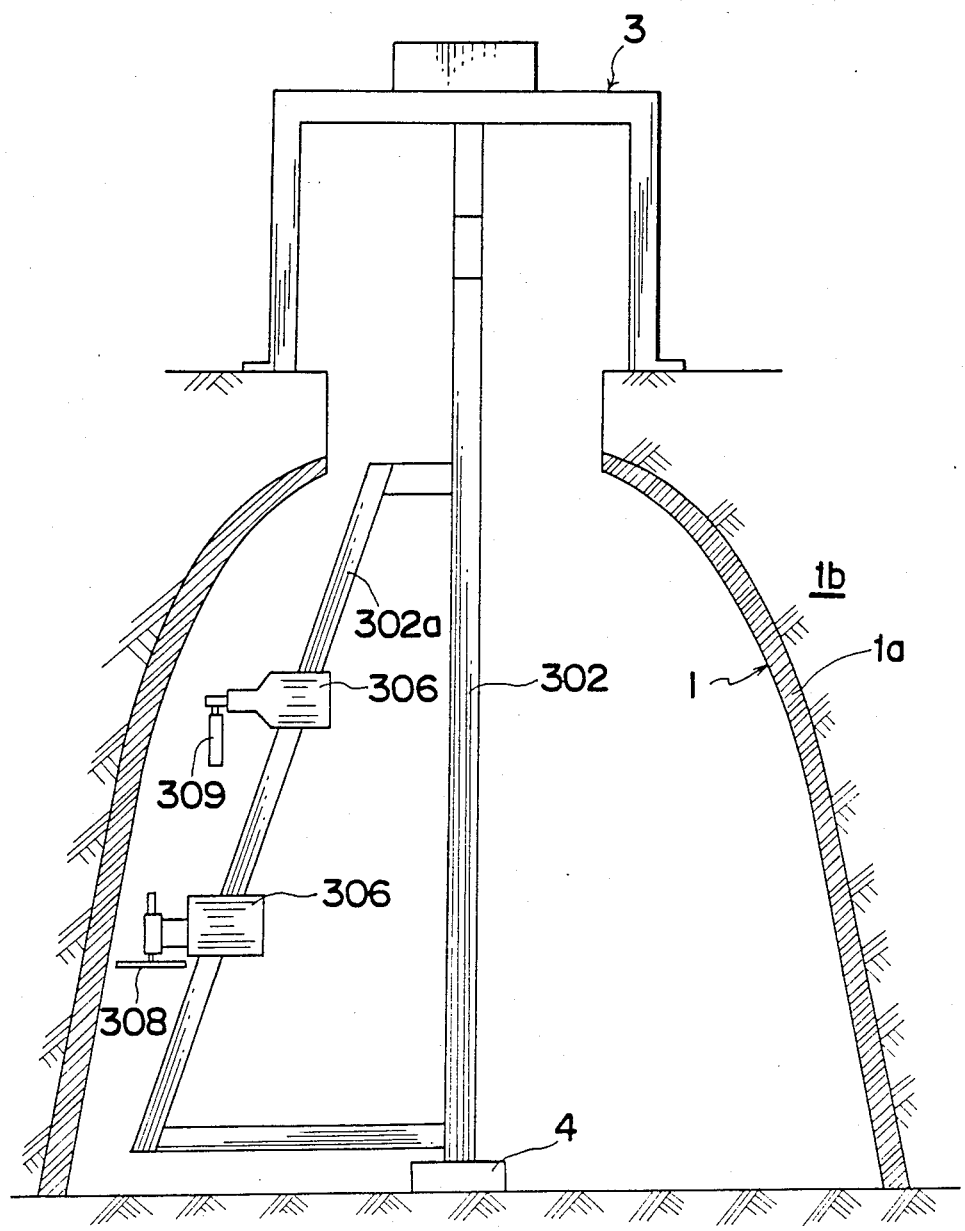
FIG. 37 is a sectional view in front elevation showing a reactor shield-wall demolishing apparatus according to an eighth embodiment.

The fifth to seventh embodiments all represent demolishing apparatuses applicable to a reactor of a larger diametrical size and having a cylindrical inner wall configuration. For the purpose of demolishing a boiled water reactor (BWR) having a bell-shaped interior surface, an apparatus of the type shown in FIG. 37 can be advantageously employed.

In this embodiment, a combination of a pillar 2 and an auxiliary pillar 302a is employed, cutting devices 306 being upwardly and movably mounted to the auxiliary pillar 302a. The pillar 302 is disposed vertically, while the auxiliary pillar 302a is tilted so that it extends along and adjacent to the bell-shaped inner surface of the shield wall 1. Trough this arrangement it is possible to allow the cutting devices to move toward the inner surface of the shield wall 1. This permits accurate cutting.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for demolishing a reactor shield wall which includes a pillar extending from the top side of the reactor toward the bottom of the reactor, upper support means for supporting a tip portion of the pillar at the top side of the reactor, and cutting means mounted to the pillar so as to be movable upwardly and downwardly along the pillar wherein said pillar is rotatably supported by said upper support means, and said upper support means is provided with drive means for rotating the pillar, said pillar extending generally along the axis of the reactor interior and having at the lower end thereof a lower support means, said lower support means having a body rotatably fitted on the lower end of the pillar, a plurality of arms extending horizontally radially from said body, said arms being retractably projectable, and drive means for projecting and retracting said arms, whereby the front end of each arm is pressed against the inner surface of the reactor shield wall, and wherein said pillar (2) comprises an upper pillar (2a) mounted to the upper support means (3), a lower pillar (2b) to which the lower support means (4') are mounted, and intermediate pillars (22, 23) removably fitted between said upper pillar (2a) and lower pillar (2b), the lower end portion of said upper pillar (2a) and the upper end portion of said lower pillar having connecting means (20, 21) for connecting both pillars.

2. An apparatus as set forth in claim 1, wherein said pillar (2) is provided with an intermediate support means (4") and drive means for moving said intermediate support means (4") upward and downward along the pillar (2), said intermediate support means (4") having a body (240) fitted over the outer periphery of the pillar (2), a plurality of arms (141) extending horizontally radially from said body (240), said arms (141) being retractably projectable, and drive means (139) for projecting and retracting said arms (141), whereby the front end of each arm (141) is pressed against the inner surface of the reactor shield wall (1).

3. An apparatus as set forth in claim 1, wherein said intermediate pillar is chosen from a group of intermediate pillars which have different lengths, respectively.

4. An apparatus for demolishing a reactor shield wall which includes at least one pillar extending from the top side of the reactor toward the bottom of the reactor, upper support means for supporting a tip portion of the pillar at the top side of the reactor, and cutting means mounted to the pillar so as to be movable upwardly and downwardly along the pillar, wherein said pillar is rotatably supported by said upper support means, and said upper support means is provided with drive means for rotating the pillar, a horizontally extending arm (305) is mounted to said upper support means (303) through a rotary shaft (304), said pillar (302) being mounted to one end of said arm (305), a circular guide rail (350) coaxial with the reactor interior is placed at a level above the reactor and wherein wheels (352) for rolling movement along said guide rail (350) are provided at both ends of said arm (305) and wherein said at least one pillar comprises a pair of pillars (302) respectively mounted to respective ends of the arm (305) so as to balance each other.

5. An apparatus for demolishing a reactor shield wall which includes at least one pillar extending from the top side of the reactor toward the bottom of the reactor, upper support means for supporting a tip portion of the at least one pillar at the top side of the reactor, and cutting means mounted to the at least one pillar so as to be movable upwardly and downwardly along the pillar, wherein said at least one pillar is rotatably supported by said upper support means, and said upper support means is provided with drive means for rotating the pillar, a horizontally extending arm is mounted to said upper support means through a rotary shaft, said at least one pillar being mounted to one end of said arm, said upper support means (303) have a circular guide rail (331) coaxial with the axis of the reactor, a wheel (354) for rolling movement along said guide rail (331) is provided at both ends of said arm (305) and wherein said at least one pillar comprises a pair of pillars (302) respectively mounted to respective ends of the arm (305) so as to balance each other.

6. An apparatus for demolishing a reactor shield wall which includes at least one pillar extending from the top side of the reactor toward the bottom of the reactor, upper support means for supporting a tip portion of the pillar at the top side of the reactor, and cutting means mounted to the pillar so as to be movable upwardly and downwardly along the pillar, said pillar is rotatably supported by said upper support means, and said upper support means is provided with drive means for rotating the pillar, said upper support means comprises an arm (305) supported rotatably at a level above the reactor and along the peripheral edge of the reactor and extending in horizontal directions, the upper end of said pillar (302) being horizontally movably supported by said arm (305) and wherein said at least one pillar comprises a pair of pillars (302) respectively mounted to respective ends of the arm (305) so as to balance each other.

7. An apparatus as set forth in claim 6, wherein a circular guide rail (491) coaxial with the axis of the reactor is provided above the upper peripheral edge of the reactor, wheels (454) being provided at both ends of said arm (305) for rolling movement on said guide rail (491).

8. An apparatus for demolishing a reactor shield wall which includes a pillar extending from the top side of the reactor toward the bottom of the reactor, upper support means for supporting a tip portion of the pillar at the top side of the reactor, and cutting means mounted to the pillar so as to be movable upwardly and downwardly along the pillar, said pillar is rotatably supported by said upper support means, and said upper support means is provided with drive means for rotating the pillar, said upper support means comprises a horizontally extending arm (433), and wherein a circular guide rail (491) coaxial with the axis of the reactor is placed above the upper peripheral edge of the reactor, there being provided at both ends of said arm (433) wheels (453, 454) for rolling movement on said guide rail (491), said pillar (302) being mounted at a median portion of said arm (433), and wherein there are provided a pedestal (404) hung up and down movably within the reactor interior and having thereon a circular guide rail (424) coaxial with the axis of the reactor, and fixing means (440, 441) for fixing said pedestal (404) by being pressed against the shield wall (1), said fixing means being fixed to said pedestal (404) and movable toward and away from the shield wall (1), there being provided at the lower end of said pillar (302) a wheel (422) for rolling movement on the guide rail (424) on said pedestal (404).

9. An apparatus for demolishing a reactor shield wall which includes a pillar extending from the top side of the reactor toward the bottom of the reactor, upper support means for supporting a tip portion of the pillar at the top side of the reactor, and cutting means mounted to the pillar so as to be movable upwardly and downwardly along the pillar, said pillar is rotatably supported by said upper support means, and said upper support means is provided with drive means for rotating the pillar, said upper support means comprises an arm supported rotatably at a level above the reactor and along the peripheral edge of the reactor and extending in horizontal directions, the upper end of said pillar being horizontally movably supported by said arm, and said pillar having lower support means (4) disposed at the bottom of the reactor, the lower end of said pillar (302) being connected to extensible support means (403, 403a) horizontally projectable and rotatably mounted to said lower support means (4).

10. An apparatus as set forth in claim 9, wherein said pillar (302) has up and down movable intermediate support means (404).

11. An apparatus for demolishing a reactor shield wall which includes a pillar extending from the top side of the reactor toward the bottom of the reactor, an upper support means for supporting a tip portion of the pillar at the top side of the reactor, and cutting means mounted to the pillar so as to be movable upwardly and downwardly along the pillar, wherein said pillar is rotatably supported by said upper support means, and said upper support means is provided with drive means for rotating the pillar, and guide means provided at the upper edge side of the reactor, one end of said upper support means (305a) being supported by said guide means, said pillar (302) being mounted to to the other end of said upper support means, said guide means comprising an inner and outer circular guide rail (411, 412), said upper support means (305a) having at one end thereof wheels (454, 453) for rolling movement on the guide rails (411, 412), said outer guide rail (412) supporting said wheel (453) from above, said inner guide rail (411) supporting said wheel (454) from below.

12. An apparatus for demolishing a reactor shield wall which includes at least one pillar extending from the top side of the reactor toward the bottom of the reactor, upper support means for supporting a tip portion of the pillar at the top side of the reactor, and cutting means mounted to the pillar so as to be movable upwardly and downwardly along the pillar, said pillar is rotatably supported by said upper support means, and said upper support means is provided with drive means for rotating the pillar, said pillar (302) has an auxiliary pillar (302a) extending along an inclined inner surface of the shield wall (1), said cutting means being mounted to said auxiliary pillar so as to be movable upwardly and downwardly along said auxiliary pillar (302a) and wherein said at least one pillar comprises a main pillar (302) having a top end supported by the upper support means and a lower end supported by lower support means (4), said auxiliary pillar (302a) having a top end secured to the upper part of the main pillar and a lower end secured to the lower part of the main pillar.

* * * * *